(12) United States Patent
Abe et al.

(10) Patent No.: US 10,816,951 B2
(45) Date of Patent: Oct. 27, 2020

(54) EMULATION OF A CONTROL SYSTEM AND CONTROL METHOD FOR ABNORMALITY DETECTION PARAMETER VERIFICATION

(71) Applicant: OMRON Corporation, Kyoto (JP)

(72) Inventors: Yutaka Abe, Rittou (JP); Shinsuke Kawanoue, Kyoto (JP); Kota Miyamoto, Nara (JP); Yuki Ueyama, Kyoto (JP)

(73) Assignee: OMRON Corporation, Kyoto (JP)

( * ) Notice: Subject to any disclaimer, the term of this patent is extended or adjusted under 35 U.S.C. 154(b) by 27 days.

(21) Appl. No.: 16/219,973

(22) Filed: Dec. 14, 2018

(65) Prior Publication Data

US 2019/0278247 A1    Sep. 12, 2019

(30) Foreign Application Priority Data

Mar. 12, 2018 (JP) ................................. 2018-044474

(51) Int. Cl.
*G05B 19/05* (2006.01)
*G05B 13/02* (2006.01)
(Continued)

(52) U.S. Cl.
CPC ....... *G05B 19/058* (2013.01); *G05B 13/0265* (2013.01); *G05B 19/0428* (2013.01);
(Continued)

(58) Field of Classification Search
CPC .... G05B 19/41885; G05B 2219/13174; G05B 2223/06
See application file for complete search history.

(56) References Cited

U.S. PATENT DOCUMENTS

2005/0066241 A1    3/2005 Gross et al.
2007/0142936 A1*   6/2007 Denison ............... G05B 13/048
                                                        700/29
(Continued)

FOREIGN PATENT DOCUMENTS

DE    102009030842    12/2010
EP        3196717     7/2017
(Continued)

OTHER PUBLICATIONS

"Search Report of Europe Counterpart Application", dated Jun. 17, 2019, p.1-p.9.

*Primary Examiner* — Robert E Fennema
*Assistant Examiner* — Tameem D Siddiquee
(74) *Attorney, Agent, or Firm* — JCIPRNET

(57) ABSTRACT

A control system and a control method are provided. A control device in the control system includes a computation processing unit related to control of a control target, a collection unit that executes a process of collecting data associated with the control target, and a monitoring processing unit that executes a process of monitoring a state of the control target and includes a feature quantity generation unit that executes a process for generating a feature quantity from the collected data, and a detection unit that executes a for detecting an abnormality occurring in the control target using the generated feature quantity and an abnormality detection parameter suitable for detection of an abnormality occurring in the control target that is set based on a result of machine learning. An information processing device executes emulation of the monitoring process using the data associated with the control target from the control device.

4 Claims, 12 Drawing Sheets

(51) Int. Cl.
    *G05B 23/02*      (2006.01)
    *G05B 19/418*     (2006.01)
    *G05B 19/042*     (2006.01)

(52) U.S. Cl.
    CPC ... *G05B 19/41885* (2013.01); *G05B 23/0229* (2013.01); *G05B 23/0235* (2013.01); *G05B 2219/13174* (2013.01); *G05B 2219/14006* (2013.01); *G05B 2223/06* (2018.08)

(56) References Cited

U.S. PATENT DOCUMENTS

| | | | |
|---|---|---|---|
| 2008/0077928 A1* | 3/2008 | Matsuzaki | G06F 9/5044 718/104 |
| 2014/0222379 A1* | 8/2014 | Martinez Heras | G05B 23/024 702/188 |
| 2017/0205811 A1* | 7/2017 | Grgic | G05B 19/05 |
| 2018/0068906 A1 | 3/2018 | Ogi et al. | |
| 2019/0227528 A1* | 7/2019 | Abbott | B25F 5/00 |

FOREIGN PATENT DOCUMENTS

| | | |
|---|---|---|
| JP | 2017211930 | 11/2017 |
| WO | 2017115162 | 7/2017 |

* cited by examiner

| Target data | Domain | Change behavior | | Feature quantity name |
|---|---|---|---|---|
| Single data | Time domain | Median value changes | 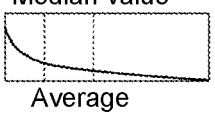 | Median value |
| Single data | Time domain | Difference changes | x−y | Difference |
| Single/plural pieces of data | Time domain | Ratio changes | x/y | Ratio |
| Single/plural pieces of data | Time domain | Duty ratio changes |  | Duty ratio |
| Single data | Time domain | Maximum value changes | 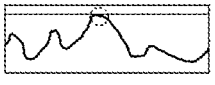 | Maximum value |
| Single data | Time domain | Minimum value changes | 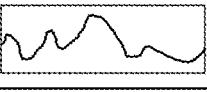 | Minimum value |
| Plural pieces of data | Time domain | Synchronization deviation (plural axes) increases | 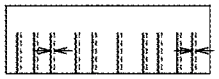 | Synchronization deviation (plural axes) pulse |
| Plural pieces of data | Time domain | Synchronization deviation (two axes) increases | 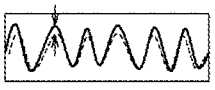 | Cyclic synchronization deviation (two axes) |
| Plural pieces of data | Time domain | Correlation value changes | 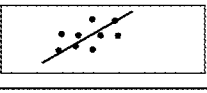 | Correlation value |
| Plural pieces of data | Time domain | Mahalanobis distance changes | 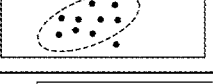 | Mahalanobis distance |
| Plural pieces of data | Time domain | Jack knife distance changes | $Ji = \sqrt{\frac{(n-1)n^2}{(n-1)n^3}} \times \frac{M^2}{1 - \frac{M_i}{(n-1)n^2}}$ | Jack knife distance |
| Single data | Time domain | Quartile changes | 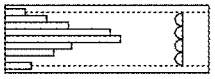 | Quartile |
| Single data | Time domain | Cycle variation increases | 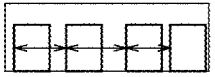 | Cycle variation |

FIG.7

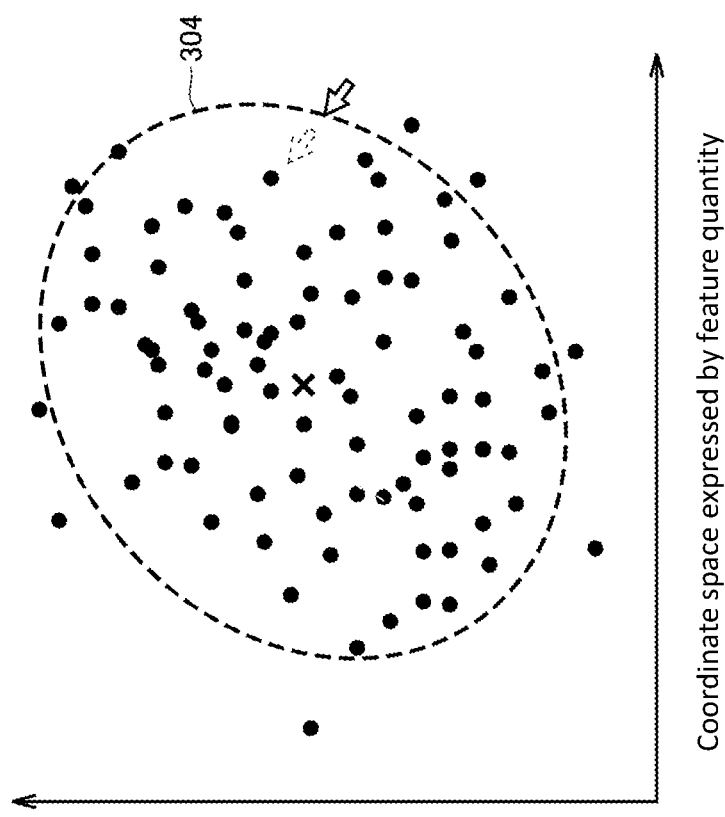
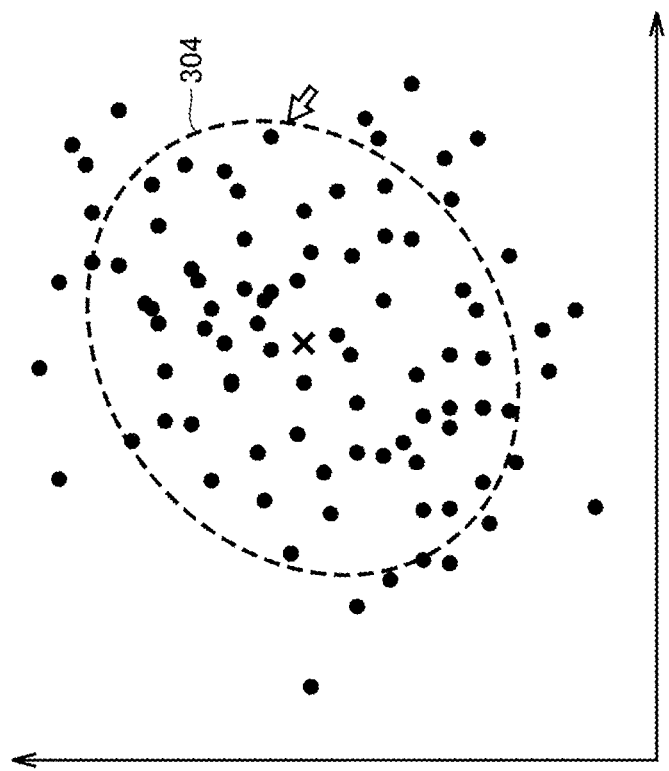
FIG.9(A)
FIG.9(B)

EMULATION OF A CONTROL SYSTEM AND CONTROL METHOD FOR ABNORMALITY DETECTION PARAMETER VERIFICATION

CROSS-REFERENCE TO RELATED APPLICATION

This application claims the priority of Japan patent application serial no. 2018-044474, filed on Mar. 12, 2018. The entirety of the above-mentioned patent application is hereby incorporated by reference herein and made a part of this specification.

BACKGROUND

Technical Field

The present disclosure relates to a control system and a control method for controlling a control target.

Description of Related Art

In various production sites, factory automation (FA) technology using a control device such as a programmable logic controller (PLC) is widely used. With recent developments in information and communication technology (ICT), such a control device in the field of FA also has increasingly high performance and advanced functions.

As one example of such high performance and advanced functions, a function of predicting failure of a device that is a control target using machine learning has been proposed. For example, Japanese Patent Application Laid-Open No. 2017-211930 (Patent Document 1) discloses a server including a machine learning device. The server including the machine learning device detects the presence or absence of failure or a degree of failure of a current device by executing machine learning using input data such as an output of a sensor provided in the device, which is received via a network.

In a case where a server is used as in Patent Document 1, reliability of machine learning in a server is degraded when loss of data, lack of data, or the like occurs due to, for example, an error during communication with the server. Therefore, a technique for performing abnormality detection using reliable machine learning on a control device side such as a PLC instead of causing the server to perform the machine learning is desired.

SUMMARY

A control system according to an example of the present disclosure is a control system including a control device that controls a control target; and an information processing device capable of exchanging data with the control device, wherein the control device includes a computation processing unit that executes control computation of sequence control and motion control related to the control target; a collection unit that executes a process of collecting data associated with the control target; and a monitoring processing unit that executes a process of monitoring a state of the control target, the monitoring processing unit includes a feature quantity generation unit that executes a feature quantity generation process for generating a feature quantity from the data collected by the collection unit; and a detection unit that executes an abnormality detection process for detecting an abnormality occurring in the control target using the feature quantity generated by the feature quantity generation unit and an abnormality detection parameter suitable for detection of an abnormality occurring in the control target that is set based on a result of machine learning, and the information processing device includes a monitoring emulator that executes emulation of the monitoring process of the monitoring processing unit using the data associated with the control target from the control device.

A control method according to an example of the present disclosure is a control method that is executed by an information processing device capable of exchanging data with a control device that controls a control target, wherein the control device includes a computation processing unit that executes control computation of sequence control and motion control related to the control target, a collection unit that executes a process of collecting data associated with the control target, and a monitoring processing unit that executes a process of monitoring a state of the control target, the monitoring processing unit includes a feature quantity generation unit that executes a feature quantity generation process for generating a feature quantity from the data collected by the collection unit; and a detection unit that executes an abnormality detection process for detecting an abnormality occurring in the control target using the feature quantity generated by the feature quantity generation unit and an abnormality detection parameter suitable for detection of an abnormality occurring in the control target that is set based on a result of machine learning, and the control method comprises receiving the data associated with the control target from the control device; and executing emulation of the monitoring process of the monitoring processing unit using the data associated with the control target received from the control device.

BRIEF DESCRIPTION OF THE DRAWINGS

FIG. 7 is a diagram schematically illustrating an example of a list showing feature quantities that can be determined in a data mining step of the control system according to the embodiment.

FIG. 9(A) and FIG. 9(B) are diagrams schematically illustrating an example of learning data according to the embodiment.

DESCRIPTION OF THE EMBODIMENTS

Figure 1:
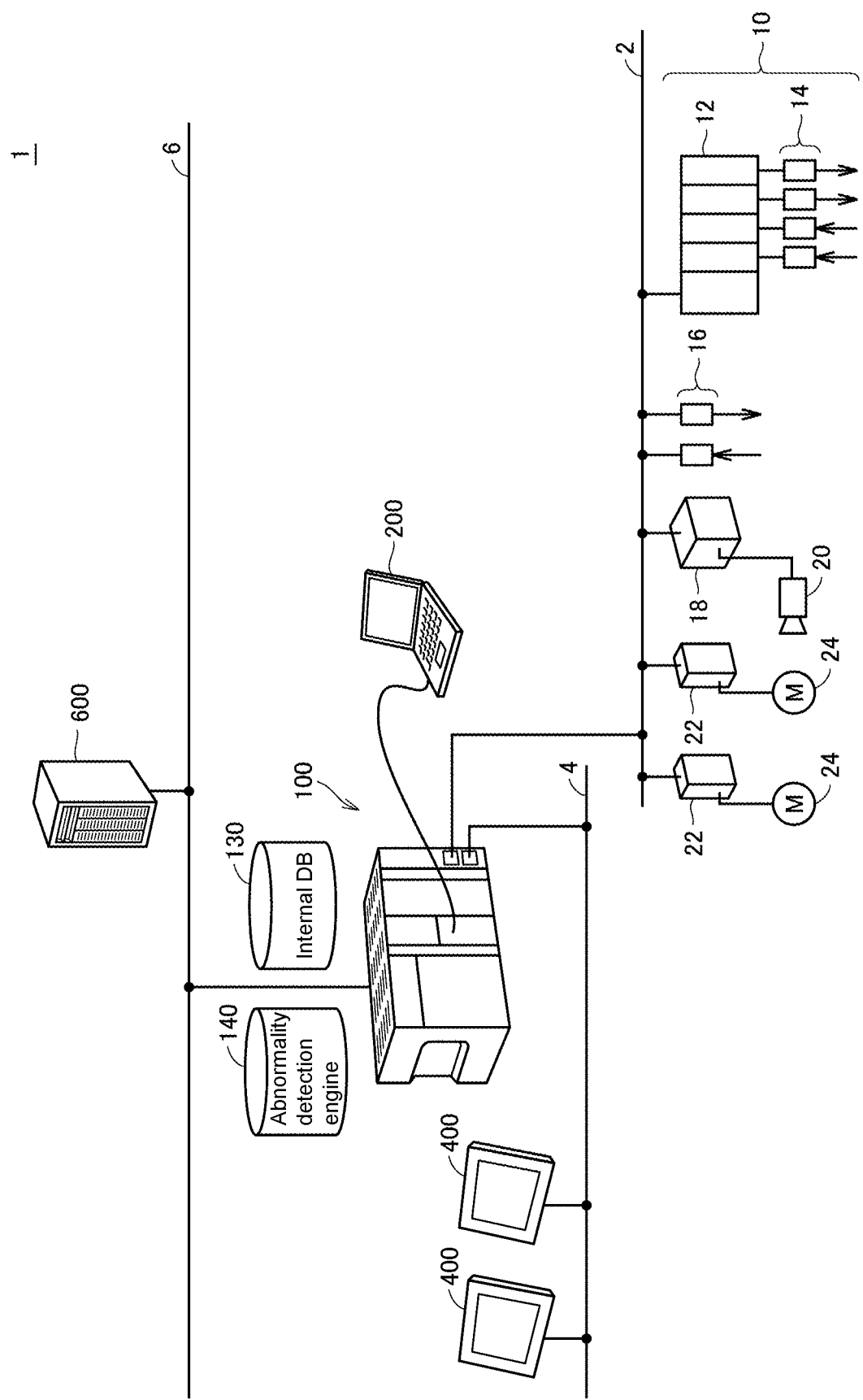
FIG. 1 is a schematic diagram illustrating an overall configuration example of a control system 1 according to the embodiment.

This disclosure provides an environment in which abnormality detection can be performed using reliable machine learning by a control device.

According to the above-described disclosure, in the information processing device, the monitoring process of the monitoring processing unit of the control device can be emulated by the monitoring processing emulator and the monitoring process of the monitoring processing unit of the control device can be reproduced in the information processing device. Therefore, it is possible to provide content of the reproduction as information for confirming whether or not abnormality detection based on reliable machine learning can be performed inside the control device.

According to an embodiment of the disclosure, the control device further includes a database that stores the data associated with the control target collected by the collection unit in time series, and the data associated with the control target that is used by the monitoring emulator of the information processing device includes data in the database of the control device.

According to the above disclosure, the information processing device can reproduce the monitoring process of the monitoring processing unit of the control device retroactively by performing emulation of the monitoring emulator using the time-series data stored (accumulated) in time series.

According to an embodiment of the disclosure, the information processing device evaluates validity indicating whether or not the abnormality detection parameter held in the control device is suitable for detection of the abnormality occurring in the control target based on a result of the emulation of the monitoring process.

According to the above disclosure, it is possible to evaluate validity indicating whether or not the abnormality detection parameter is suitable for detection of an abnormality occurring in a control target.

According to an embodiment of the disclosure, the control device further includes an execution management unit that cyclically executes collection of data of the collection unit and control computation of the computation processing unit and executes a cyclic execution process for causing collection of data of the collection unit and control computation of the computation processing unit to be executed with a higher priority than the monitoring process of the monitoring processing unit in the cyclic execution, wherein the information processing device includes a cyclic execution emulator that emulates the cyclic execution process of the execution management unit, and emulation of a monitoring process of the monitoring emulator is executed in the emulation of the cyclic execution process of the cyclic execution emulator.

According to the above disclosure, regarding the evaluation of the validity of the abnormality detection parameter, the information processing device can emulate the cyclic (periodical) execution of the control computation of the control device and evaluate the validity based on a result of the emulation of the monitoring process of the monitoring emulator in the cyclic execution.

According to an embodiment of the disclosure, the information processing device evaluates validity indicating whether or not the abnormality detection parameter that is held in the control device is suitable for detection of an abnormality occurring in the control target, based on a result of the emulation of the cyclic execution process.

According to the above disclosure, it is possible to evaluate the validity of the abnormality detection parameter based on the result of the emulation of the cyclic execution process.

According to an embodiment of the disclosure, the evaluation of the validity based on the result of the emulation of the cyclic execution process includes evaluation of the validity based on a result of a comparison between a time taken for emulation of the monitoring process in the emulation of the cyclic execution process and a length of the cycle.

According to the above disclosure, it is possible to perform evaluation of the validity from the time taken for emulation of the monitoring processing in the emulation of the cyclic execution process.

According to an embodiment of the disclosure, the control device further includes a database that stores the data associated with the control target collected by the collection unit in time series, and the information processing device further includes a time-series feature quantity generation unit that generates a feature quantity from time-series data of the data associated with the control target in the database of the control device, and a determination unit that determines an abnormality detection parameter suitable for detection of an abnormality occurring in the control target by performing machine learning using the feature quantity generated by the time-series feature quantity generation unit.

According to the above disclosure, the information processing device can generate the feature quantity from the time-series data of the data associated with the control target in the database of the control device, and determine an abnormality detection parameter suitable for detection of an abnormality occurring in the control target from the learning result of the machine learning using the generated feature quantity.

According to an embodiment of the disclosure, the monitoring emulator includes a feature quantity generation emulator that executes emulation of a feature quantity generation process of the feature quantity generation unit, and the time-series feature quantity generation unit includes a unit that causes the feature quantity generation emulator to execute emulation of the feature quantity generation process using the time-series data in the database to generate a feature quantity from the time-series data.

According to the above disclosure, the information processing device causes the feature quantity generation emulator to execute emulation of the feature quantity generation process, such that the feature quantity can be generated from the time-series data.

According to an embodiment of the disclosure, the abnormality detection parameter suitable for detection of the abnormality occurring in the control target includes a threshold value for classifying the feature quantity generated by the feature quantity generation unit into a class of feature quantities suitable for detection of the abnormality occurring in the control target.

According to the above disclosure, the threshold value for classifying the feature quantities into classes can be included in the abnormality detection parameter.

According to an embodiment of the disclosure, the control device holds a class of the feature quantity suitable for detection of the abnormality occurring in the control target, and the control device updates the feature quantity of the class using the feature quantity that is generated by the feature quantity generation unit during execution of the monitoring process.

In the above disclosure, the control device can update the feature quantity of the class using the feature quantity generated from the data collected from the control target, and the classification into classes using the updated class becomes possible.

According to the above disclosure, in the information processing device, the monitoring process of the monitoring processing unit of the control device can be emulated by the monitoring processing emulator and the monitoring process of the monitoring processing unit of the control device can be reproduced in the information processing device. Therefore, it is possible to provide content of the reproduction as information for confirming whether or not abnormality detection based on reliable machine learning can be performed inside the control device.

According to this disclosure, it is possible to provide an environment in which a control device can perform abnormality detection using reliable machine learning.

Embodiments of the present disclosure will be described in detail with reference to the drawings. In the figures, the same or corresponding units are denoted by the same reference numerals, and description thereof will not be repeated.

<A. Application Example>

Figure 4:
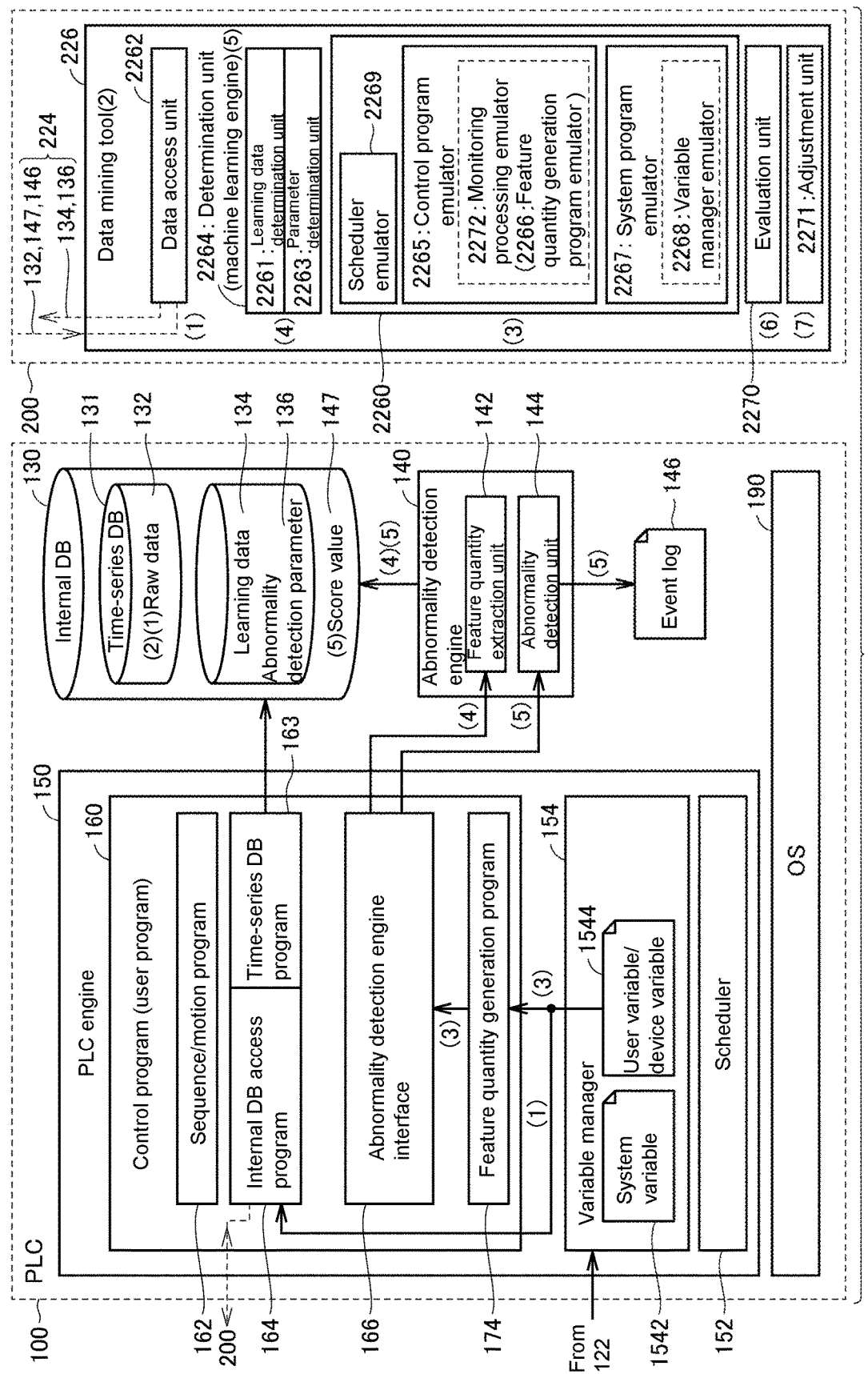
FIG. 4 is a schematic diagram illustrating an example of a situation in which the control system 1 according to the embodiment is applied.

First, an example of a situation in which the present disclosure is applied will be described with reference to FIG. 4. FIG. 4 is a schematic diagram illustrating an example of a situation in which a control system 1 according to the embodiment is applied. In the control system 1 according to the embodiment, the control device 100 controls an arbitrary control target (for example, a manufacturing device or equipment included in a production line).

FIG. 4 schematically illustrates functions that are provided by respective devices of the control system 1. The control system 1 includes a control device 100 that controls a control target and a support device 200 that can exchange data with the control device 100. The control device 100 corresponds to an industrial controller such as a PLC that controls control targets such as various facilities or devices. The PLC is a type of computer that executes a control computation. The support device 200 provides a user with, for example, an environment for developing a module (typically, data, programs, or the like) included in the control device 100 or an environment for monitoring a state of the control device 100. The support device 200 includes an example of the "information processing device" and typically includes a general-purpose computer.

The control device 100 includes a computation processing unit that executes control computation of sequence control and motion control related to a control target, a collection unit that executes a process of collecting data (raw data 132) associated with the control target, and a monitoring processing unit that executes a process of monitoring a state of the control target.

When the production line or the like is in operation, a PLC engine 150 executes a variable manager 154 corresponding to a "collection unit" to collect data associated with the control target while executing a sequence/motion program 162 corresponding to the "control computation." Further, the "monitoring processing unit" includes a feature quantity generation unit that executes a feature quantity generation process of generating a feature quantity from the collected data, and an abnormality detection engine 140.

The feature quantity generation unit corresponds to a feature quantity generation program 174, and the feature quantity generation process is executed by executing the feature quantity generation program 174. The abnormality detection engine 140 executes an abnormality detection process of detecting an abnormality occurring in a control target using the feature quantity generated by the feature quantity generation unit and an abnormality detection parameter 136 or learning data 134 suitable for detection of an abnormality held in an internal DB 130. The abnormality detection parameter 136 or the learning data 134 is based on a learning result of machine learning of the support device 200.

The support device 200 includes a monitoring processing emulator 2272 that executes emulation of the "monitoring processing unit" using the data associated with the control target from the control device 100. The monitoring processing emulator 2272 executes an instruction to emulate the feature quantity generation program 174 and a program of the abnormality detection engine 140 in a processor environment that is provided by a computer of the support device 200. Accordingly, the "monitoring processing unit" of the control device 100 is emulated in the support device 200.

Thus, in the support device 200, the monitoring process of the "monitoring processing unit" of the control device 100 can be emulated by the monitoring processing emulator 2272 and the monitoring process of the "monitoring processing unit" of the control device 100 can be reproduced in the support device 200. Therefore, it is possible to provide content of the reproduction as information for confirming whether or not reliable machine learning can be performed inside the control device 100.

The "collection unit" of the control device 100 corresponds to the variable manager 154. The variable manager 154 collects data of a user variable and device variable 1544 that is updated by an I/O refresh process that is cyclically executed, in synchronization with the cycle. The collected data is used for the above monitoring process and is stored as time-series raw data 132 in an order of collection (detection) in a time-series DB 131. A time-series DB program 163 adds a time stamp to the raw data 132 collected by the collection unit in the order of collection (detection), and stores the resultant raw data in the time-series DB 131. This time stamp can be assigned in units of time that can be variably set, such as units of control cycles, units of works, or units of takt time.

Regarding the above reproducibility, the data associated with the control target that is used by the monitoring processing emulator 2272 of the support device 200 includes the time-series raw data 132 in the time-series DB 131 of the control device 100. Thus, the emulation in the support device 200 is performed using the time-series raw data 132 in the time-series DB 131.

Therefore, by performing emulation using the time-series data stored (accumulated) in time series, the support device 200 can reproduce the monitoring process of the "monitoring processing unit" of the control device 100 retroactively.

Regarding the above reproduction, the support device 200 is capable of exchanging data including the time-series raw data 132 in the time-series DB 131 with the control device 100. In this case, for example, a data access unit 2262 of the support device 200 can exchange data with the control device 100 via a storage medium such as a memory card in which the raw data 132 has been stored.

By exchanging such data via the storage medium instead of passing through the network, the support device 200 can receive the time-series raw data 132 in the time-series DB 131 without causing data loss due to a communication error. Therefore, in the support device 200, it is possible to improve accuracy of the reproducibility using the emulation.

It should be noted that the exchange of data between the support device 200 and the control device 100 is not limited to a method in which the exchange is via the storage medium.

The support device 200 further includes an evaluation unit 2270 that evaluates validity indicating whether or not the abnormality detection parameter 136 held in the control device 100 is suitable for detection of an abnormality occurring in the control target based on a result of the emulation of the monitoring process.

Regarding such evaluation of the validity of the abnormality detection parameter 136, the support device 200 emulates cyclic execution of the control computation of the control device 100 and evaluates the validity based on a result of the emulation.

Regarding the cyclic execution of the control computation, the control device 100 cyclically executes the collection (the variable manager 154) of the data associated with the control target and control computation (the sequence/motion program 162) according to a computation process. In this cyclic execution, the control device 100 further includes an execution management unit (a scheduler 152) that executes a cyclic execution process for executing the collection of the data associated with the control target and the control computation according to the computation process with a higher priority than the "monitoring process" (the feature quantity generation program 174 and the abnormality detection engine 140).

Regarding the emulation of the cyclic execution, the support device 200 includes a PLC emulator 2260 that emulates the PLC engine 150. The PLC emulator 2260 includes a cyclic execution emulator (a scheduler emulator 2269) that emulates the cycle execution process of the execution management unit (the scheduler 152). In the emulation of the cyclic execution process of the cyclic execution emulator, emulation of a control program emulator 2265 (a monitoring processing emulator 2272 including a feature quantity generation program emulator 2266) and a system program emulator 2267 including a variable manager emulator 2268, which are included in the PLC emulator 2260, is executed.

Thus, the support device 200 can evaluate the validity of the abnormality detection parameter 136 based on an execution result (content of reproduction) of the emulation of the monitoring process in the emulation of the cyclic execution of the control computation of the control device 100.

For example, when the evaluation unit 2270 evaluates the validity based on the result of the emulation of the cyclic execution process, the evaluation unit 2270 can evaluate the validity based on a result of comparison of a time taken for the emulation of the monitoring process in the emulation of the cyclic execution process with a length of a cycle of the cyclic execution.

Hereinafter, a more detailed configuration and a process of the control system 1 according to the embodiment will be described as a more specific application example of the present disclosure.

<B1. Overall Configuration Example of Control System>

First, an overall configuration example of the control system 1 according to the embodiment will be described.

FIG. 1 is a schematic diagram illustrating an example of the overall configuration of a control system 1 according to the embodiment. Referring to FIG. 1, the control system 1 according to the embodiment includes a control device 100 that controls a control target, and a support device 200 that can be connected to control device 100, as main components. The support device 200 exchanges data with the control device 100 through communication or a storage medium.

The control device 100 may be embodied as a type of computer such as a programmable logic controller (PLC). The control device 100 is connected to a field device group 10 via a first field network 2 and to one or a plurality of display devices 400 via a second field network 4. Further, the control device 100 is connected to a data logging device 600 via a local network 6. The control device 100 exchanges data with the connected devices via the respective networks. It should be noted that the data logging device 600 and the display devices 400 are optional configurations and are not indispensable components of the control system 1.

The control device 100 includes a control logic (hereinafter also referred to as a "PLC engine") that executes various computations for controlling a facility or machine. In addition to the PLC engine, the control device 100 also has a collection function of collecting data (hereinafter also referred to as "input data") measured by the field device group 10 and transferred to the control device 100). Further, the control device 100 also has a monitoring function of monitoring the collected input data. By causing the control device 100 to have these functions, it is possible to monitor a phenomenon occurring in the control target at shorter cycles.

Specifically, an internal database (hereinafter, also referred to as an "internal DB") 130 mounted in the control device 100 provides the collection function, and the abnormality detection engine 140 mounted in the control device 100 provides the monitoring function. Details of the internal DB 130 and the abnormality detection engine 140 will be described later.

A network that performs cyclic communication in which an arrival time of data is guaranteed may be adopted for the first field network 2 and the second field network 4. EtherCAT (registered trademark), EtherNet/IP (registered trademark), DeviceNet (registered trademark), CompoNet (registered trademark), and the like are known as networks that perform such cyclic communication.

The field device group 10 includes a device that collects input data from the control target or a manufacturing device, a production line, or the like related to control (hereinafter also referred to as a "field"). An input relay, various sensors, or the like are assumed as such a device that collects input data. The field device group 10 further includes a device that gives some actions to the field based on a command (hereinafter also referred to as "output data") generated by the control device 100. An output relay, a contactor, a servo driver, a servo motor, and another arbitrary actuator are assumed as such a device that gives some actions to the field. The field device group 10 exchanges data including the input data and the output data with the control device 100 via the first field network 2.

In the example of the configuration illustrated in FIG. 1, the field device group 10 includes a remote input/output (I/O) device 12, a relay group 14, an image sensor 18, a camera 20, a servo driver 22, and a servo motor 24.

The remote I/O device 12 includes a communication unit that performs communication via the first field network 2, and an input/output unit (hereinafter referred to as an "I/O unit") for performing acquisition of input data and output of output data. The input data and the output data are exchanged between the control device 100 and the field via such an I/O unit. An example in which digital signals are exchanged as input data and output data via the relay group 14 is illustrated in FIG. 1.

The I/O unit may be directly connected to the field network. An example in which the I/O unit 16 is directly connected to the first field network 2 is illustrated in FIG. 1.

The image sensor 18 performs an image measurement process such as pattern matching on image data captured by the camera 20 and transmits a result of the process to the control device 100.

The servo driver 22 drives the servo motor 24 according to output data (for example, a position command) from the control device 100.

As described above, data is exchanged between the control device 100 and the field device group 10 via the first field network 2, but these exchanged pieces of data are updated in a very short cycle on the order of hundreds of μsec to tens of msec. It should be noted that this process of updating the exchanged data may be referred to as an "I/O refresh process."

In addition, the display device 400 connected to the control device 100 via the second field network 4 transmits, for example, a command according to a user operation to the control device 100 in response to an operation from the user, and graphically displays, for example, a result of computation in the control device 100.

The data logging device 600 is connected to the control device 100 via the local network 6, and exchanges necessary data with the control device 100. The data logging device 600 has, for example, a database function, and collects, for example, event logs that are generated by the control device 100, in a time-series. A general-purpose protocol such as Ethernet (registered trademark) may be mounted on the local network 6. That is, typically, a transmission cycle or an updating cycle of data in the local network 6 may be later than a transmission cycle or an updating cycle of data in the field network (the first field network 2 and the second field network 4). However, the local network 6 may be able to transmit more data at the same time than the field network.

The support device 200 is a device that supports preparation necessary for the control device 100 to control the control target. Specifically, the support device 200 provides, for example, a program development environment (a program creation and editing tool, a parser, a compiler, or the like) for a program that is executed by the control device 100, a setting environment for setting parameters (configuration) of the control device 100 and various devices connected to the control device 100, a function of transmitting a generated user program to the control device 100, and a function of correcting and changing, online, the user program or the like that is executed on the control device 100.

Further, the support device 200 according to the embodiment determines, for example, the abnormality detection parameter 136 using the time-series raw data 132, to be described later, of the internal DB 130 mounted in the control device 100, and also provides an environment in which the abnormality detection engine 140 is emulated. Details of this emulation will be described later.

<B. Example of Hardware Configuration of Each Device>

Next, an example of a hardware configuration of main devices constituting the control system 1 according to the embodiment will be described.

(b1: Example of Hardware Configuration of Control Device 100)

Figure 2:
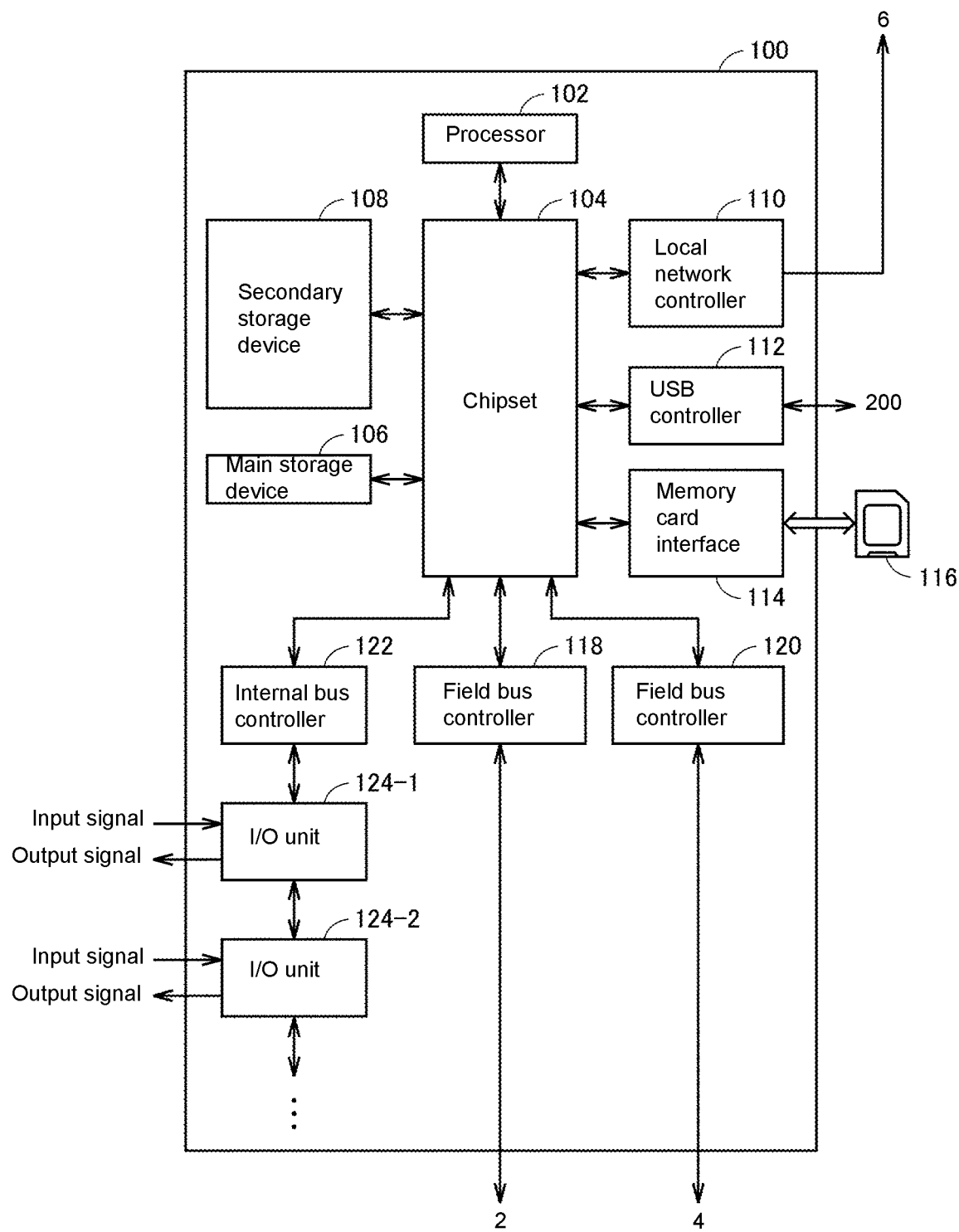
FIG. 2 is a block diagram illustrating an example of a hardware configuration of a control device constituting the control system 1 according to the embodiment.

FIG. 2 is a block diagram illustrating an example of a hardware configuration of the control device 100 constituting the control system 1 according to the embodiment. Referring to FIG. 2, the control device 100 includes, for example, a processor 102 such as central processing unit (CPU) or a micro-processing unit (MPU), a chipset 104, a main storage device 106, a secondary storage device 108, a local network controller 110, a Universal Serial Bus (USB) controller 112, a memory card interface 114, an internal bus controller 122, field bus controllers 118 and 120, I/O units 124-1 and 124-2.

The processor 102 reads various programs stored in the secondary storage device 108, develops the programs in the main storage device 106, and executes the programs, thereby realizing control according to the control target and various processes to be described later. The chipset 104 realizes a process of the entire control device 100 by controlling the processor 102 and each component.

The secondary storage device 108 stores a user program to be executed using the PLC engine, in addition to a system program for realizing the PLC engine. Further, a program for realizing the internal DB 130 and the abnormality detection engine 140 is also stored in the secondary storage device 108.

The local network controller 110 controls exchange of data with other devices via the local network 6. The USB controller 112 controls exchange of data with the support device 200 via a USB connection.

The memory card interface 114 is configured such that a memory card 116 can be attached and detached, and data can be written to the memory card 116 and various pieces of data (a user program, trace data, or the like) can be read from the memory card 116.

The internal bus controller 122 is an interface that exchanges data with the I/O units 124-1, 124-2, ... mounted in the control device 100.

The field bus controller 118 controls exchange of data with other devices via the first field network 2. Similarly, the field bus controller 120 controls exchange of data with other devices via the second field network 4.

Although an example of a configuration in which the necessary functions are provided by the processor 102 executing the program has been illustrated in FIG. 2, some or all of the provided functions may be implemented using a dedicated hardware circuit (for example, an application specific integrated circuit (ASIC), a field-programmable gate array (FPGA), or the like). Alternatively, main units of the control device 100 may be realized using hardware conforming to a general-purpose architecture (for example, an industrial personal computer based on a general-purpose personal computer). In this case, a plurality of operating systems (OSs) having different uses may be executed in parallel using a virtualization technique and necessary applications may be executed on each OS.

(b2: Example of Hardware Configuration of Support Device 200)

Next, the support device 200 according to the embodiment is realized, for example, by executing a program using hardware (for example, a general-purpose personal computer) conforming to a general-purpose architecture.

Figure 3:
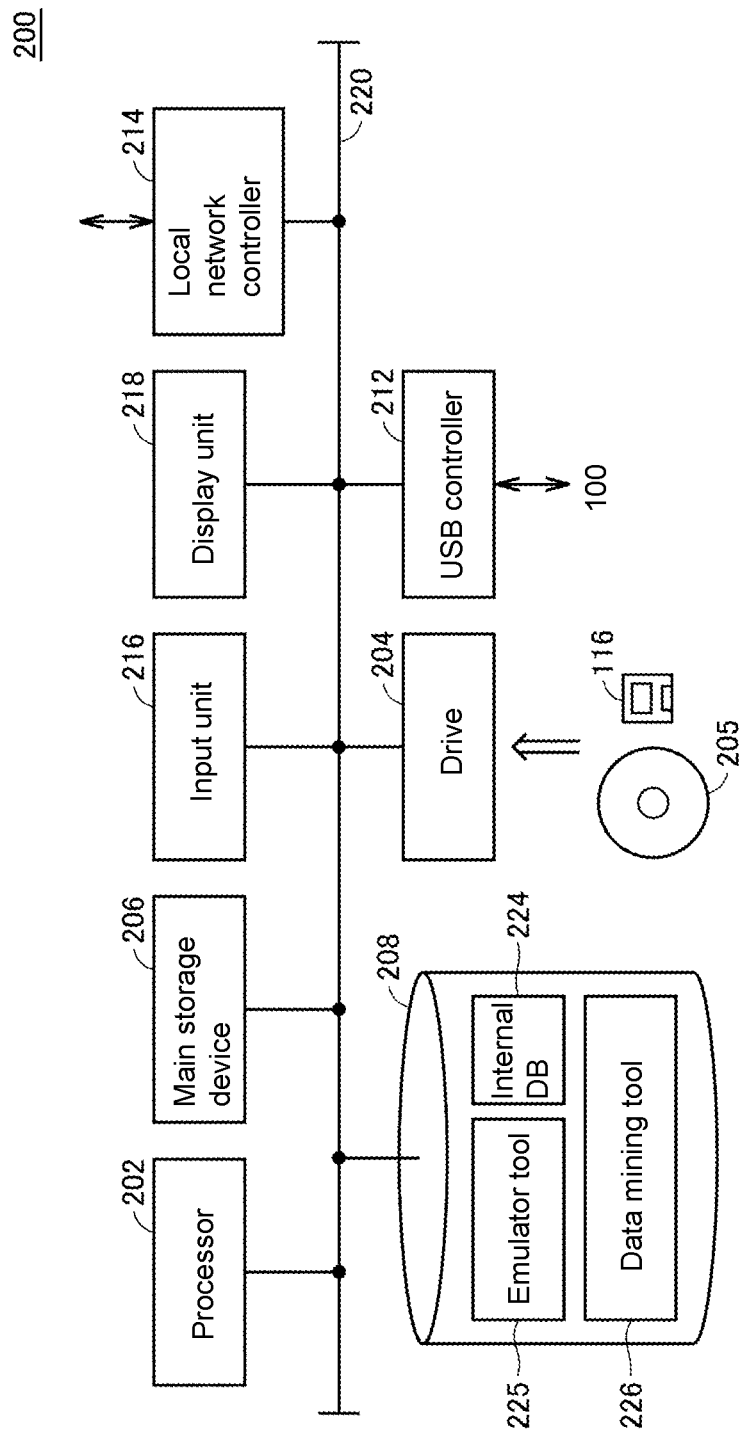
FIG. 3 is a block diagram illustrating an example of a hardware configuration of a support device constituting the control system 1 according to the embodiment.

FIG. 3 is a block diagram illustrating an example of a hardware configuration of the support device 200 constituting the control system 1 according to the embodiment. Referring to FIG. 3, the support device 200 includes a processor 202 such as a CPU or an MPU, a drive 204, a main storage device 206, a secondary storage device 208, a USB controller 212, a local network controller 214, an input unit 216, and a display unit 218. These components are connected via a bus 220.

The processor 202 reads various programs stored in the secondary storage device 208, opens the programs in the main storage device 206, and executes the programs, thereby realizing various processes as will be described later.

The secondary storage device 208 includes, for example, a hard disk drive (HDD) or a flash solid state drive (SSD). Typically, various programs including a development program (not illustrated) for performing creation of a user program to be executed in the support device 200, debug of the created program, definition of a system configuration, setting of various parameters, and the like, and an emulator tool 225 including instruction codes for executing a data mining tool 226 and a PLC emulator 2260 to be described later are stored in the secondary storage device 208. An area of an internal DB 224 that stores data related to the data mining tool 226 is provided in the secondary storage device 208. The secondary storage device 208 may store an OS and other necessary programs. In this embodiment, the data mining tool 226 includes a program or a combination of a program and data for realizing data mining in the support device 200.

The drive 204 is configured such that the memory card 116 or the storage medium 205 can be attached and detached. The drive 204 can write data to the memory card 116 or the storage medium 205 and can read various pieces of data (user program, trace data, time-series data, or the like) from the memory card 116 or the storage medium 205. The storage medium 205 includes, for example, the storage medium 205 (for example, an optical storage medium such as a digital versatile disc (DVD)) that non-transitorily stores a computer-readable program. The stored program or data is read from the memory card 116 or the storage medium 205 and installed in an internal storage area of the secondary storage device 208 or the like.

Although various programs that are executed by the support device 200 may be installed via the computer-readable memory card 116 or storage medium 205, the programs may be installed in a form in which the programs are downloaded from, for example, a server device on a network. In addition, functions that are provided by the support device 200 according to the embodiment may be realized in a form in which some modules that are provided by an OS are used.

The USB controller 212 controls exchange of data with the control device 100 via a USB connection. The local network controller 214 controls exchange of data with another device via an arbitrary network. Data that the USB controller 212 exchanges with the control device 100 includes, for example, the time-series raw data 132, the abnormality detection parameter 136, and the learning data 134 in the time-series DB 131.

The input unit 216 includes a keyboard, a mouse, or the like, and receives a user operation. The display unit 218 includes a display, various indicators, and the like, and outputs, for example, a processing result from the processor 202. A printer may be connected to the support device 200.

Although an example of a configuration in which necessary functions are provided by the processor 202 executing a program has been illustrated in FIG. 3, some or all of these provided functions may be provided by using a dedicated hardware circuit (for example, an ASIC or an FPGA).

(b3: Example of Hardware Configuration of Data Logging Device 600)

Next, the data logging device 600 constituting the control system 1 according to the embodiment can be realized, for example, by using a general-purpose file server or a database server. Since a hardware configuration of such a device is well known, detailed description thereof will not be given here.

(b4: Example of Hardware Configuration of Display Device 400)

Next, the display device 400 constituting the control system 1 according to the embodiment is referred to as a human machine interface (HMI) device. A configuration in which the display device 400 is mounted as a dedicated device may be adopted. The display device 400 may be realized using hardware according to a general-purpose architecture (for example, an industrial personal computer conforming to a general-purpose personal computer).

<C. Abnormality Detection Function>

Next, an abnormality detection function that is provided by the control system 1 according to the embodiment will be described.

Figure 5:
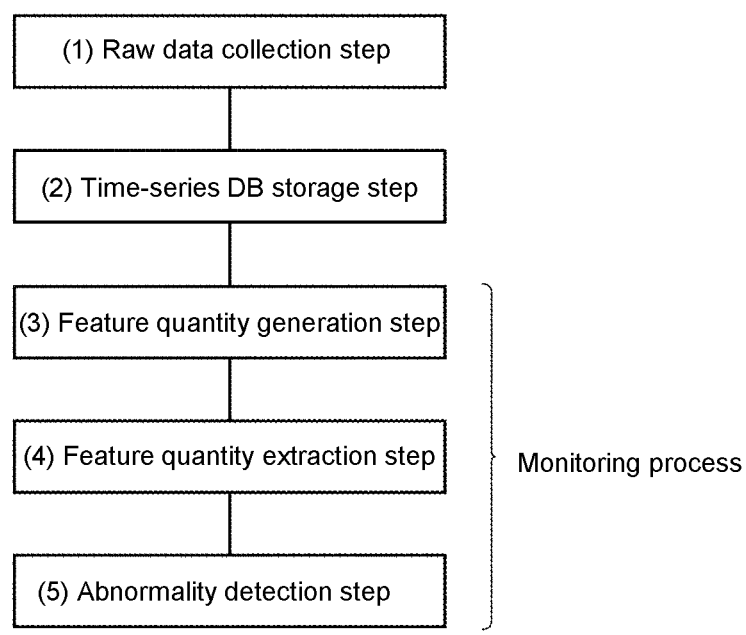
FIG. 5 is a schematic diagram illustrating a procedure of abnormality detection using the control device according to the embodiment.

FIG. 5 is a schematic diagram illustrating a procedure of abnormality detection using the control device 100 according to the embodiment. The abnormality detection procedure illustrated in FIG. 5 includes five steps as a whole.

Specifically, a raw data collection step (1) is first performed. In the raw data collection step (1), data (raw data 132) that is used for analysis related to abnormality detection among data that is handled by the control device 100 is written in the internal DB 130. The raw data collection step (1) is realized by executing an internal DB access program 164 of the control device 100 which will be described later.

In the control device 100, a unique variable name is allocated to each of data (input data and output data) that is exchanged with the field and internal data, and a user program or the like is described using each variable name. That is, in the control device 100, an environment in which variable programming is possible is provided. Therefore, in the following description, representations "designation of the variable" or "specifying of the variable" are used substantially synonymously with specifying data that is a target. It should be noted that the scope of the present disclosure is not limited to a configuration in which the variable is programmable, and a configuration in which an address in a memory is directly designated can be included in the technical scope.

A time-series DB storage step (2) of storing the collected raw data 132 in the time-series DB 131 in time series is then performed. In the time-series DB storage step (2), the time-series DB program 163 stores the collected raw data 132 in the time-series DB 131 while assigning a time stamp to the raw data 132. The time stamp corresponds to a time when the raw data 132 is collected (detected).

A feature quantity generation step (3) is then performed. In the feature quantity generation step (3), a predetermined feature quantity generation scheme is applied to data that is a target among data exchanged with the field and internal data, thereby sequentially generating feature quantities. The feature quantity generation step (3) is realized by executing a feature quantity generation program 174 of the control device 100 which will be described later.

In this embodiment, typically, an abnormality detection scheme suitable for detection of an abnormality occurring in a control target is determined by the support device 200. The abnormality detection scheme indicates a scheme capable of detecting a desired abnormality when certain data is monitored with a certain logic. In the embodiment, the abnormality detection scheme includes a scheme of generating feature quantities from one or a plurality of pieces of raw data 132 from the field. The support device 200 determines the abnormality detection scheme by executing the data mining tool. According to the determined abnormality detection scheme, settings, parameters, or the like for generating the feature quantity are output.

A feature quantity extraction step (4) is then performed. In the feature quantity extraction step (4), based on a type of feature quantity indicated by the abnormality detection parameter 136, that is, a type of feature quantity suitable for detection of the abnormality occurring in the control target, the feature quantity of the type is extracted (selected) from the feature quantities generated in the feature quantity generation step (3). The feature quantity extraction step (4) is realized by the feature quantity extraction unit 142 of the abnormality detection engine 140.

Then, an abnormality detection step (5) is performed. In the abnormality detection step (5), with respect to the feature quantity of the type selected in the feature quantity extraction step (4), the feature quantity generated in each predetermined cycle or each predetermined event is monitored, that is, an abnormality is detected from the feature quantity based on the abnormality detection parameter 136 and the learning data 134. Specifically, a score value 147 indicating a degree to which the feature quantity of the type selected in the feature quantity extraction step is to be classified into the class indicated by the learning data 134 is calculated. The score value 147 is compared with a threshold value indicated by the abnormality detection parameter 136, and when the score value 147 crosses (exceeds) the threshold value, an abnormality is detected. Further, the score value 147 in this case is stored in the internal DB 130. Further, when an abnormality is detected, an event log 146 is output. The abnormality detection step (5) is realized by the abnormality detection unit 144 of the abnormality detection engine 140.

The abnormality detection parameter 136 includes a type of feature quantity that is a monitoring target and the threshold value suitable for detection of an abnormality occurring in the control target, which is determined by the support device 200 executing the data mining tool 226.

The monitoring process in the control device 100 may include the feature quantity extraction step (4) and the abnormality detection step (5) in FIG. 5. It should be noted that the time-series DB storage step (2) is included in a series of steps in FIG. 5 for description, but is a step that can be executed concurrently with other steps.

Through the steps (1) and (3) to (5) described above, the control device 100 can perform a process of monitoring the control target, that is, selection of a feature quantity suitable for detection of an abnormality occurring in the control target and detection of an abnormality occurring in the control target using the selected feature quantity using the abnormality detection parameter 136 and the learning data 134.

<D. Data Mining Tool>

Next, a data mining tool that is provided by the control system 1 according to the embodiment will be described. In the embodiment, setting (the abnormality detection parameter 136 and the learning data 134) necessary for the monitoring process is performed based on the raw data 132 associated with the control target collected by the control device 100 using the data mining tool 226 included in the support device 200.

Figure 6:
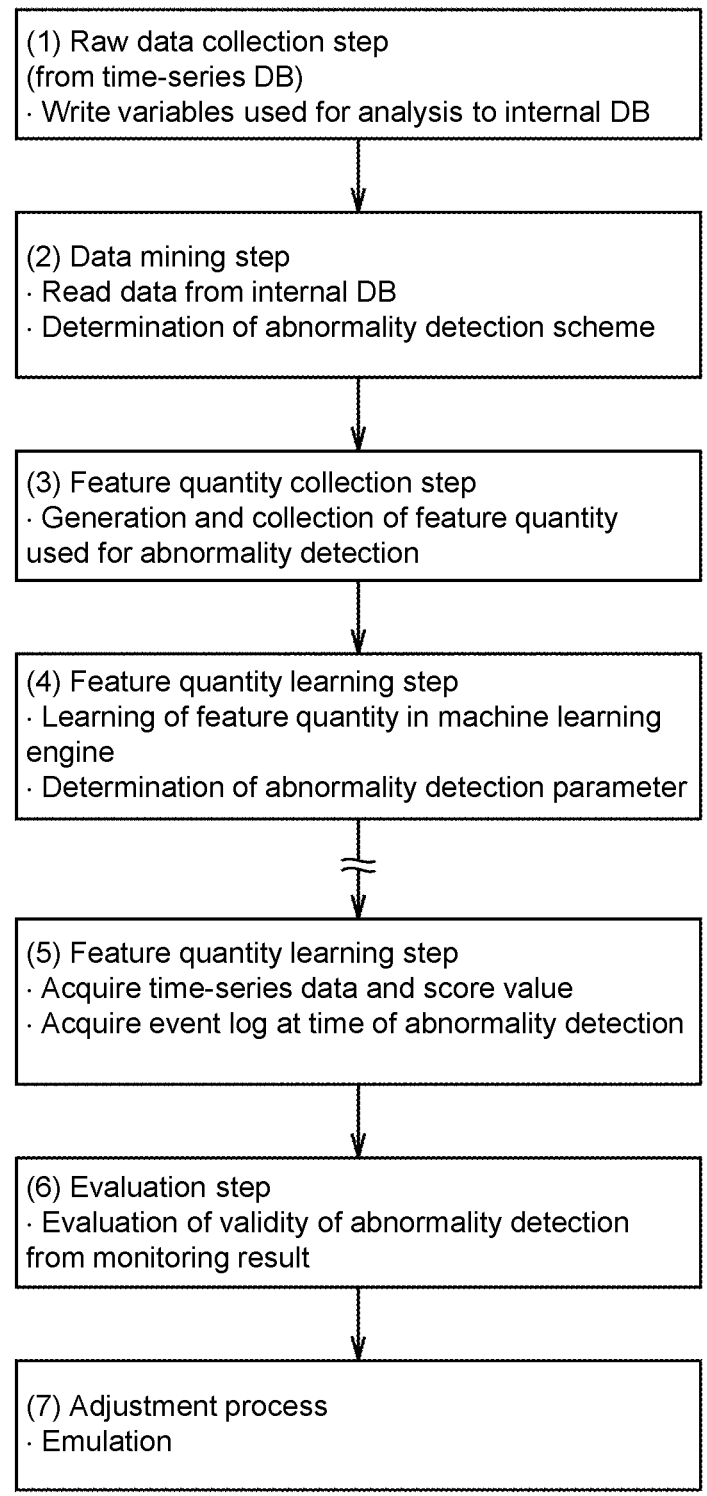
FIG. 6 is a schematic diagram illustrating a data mining procedure in the support device according to the embodiment.

FIG. 6 is a schematic diagram illustrating a data mining procedure in the support device 200 according to the embodiment. In FIG. 6, a feature quantity monitoring step (5) and an evaluation step (6) that are performed by the support device 200 are illustrated in association with steps (1) to (4) of the data mining procedure.

First, a raw data collection step (1) is performed. In the raw data collection step (1), the raw data 132 in the time-series DB 131 of the control device 100, for example, is transferred to the support device 200 via the memory card 116 and stored in the internal DB 224 such as the secondary storage device 208. The raw data collection step (1) is realized by the data access unit 2262 of the support device 200. Specifically, the data access unit 2262 accesses (reads) the memory card 116 via the drive 204 and stores the read raw data 132, for example, in the internal DB 224 such as the secondary storage device 208.

Next, a data mining step (2) is performed. In the data mining step (2), the time-series raw data 132 written to the internal DB 224 is read, and an abnormality detection scheme is determined. Specifically, the user operates the support device 200 using the data mining tool 226 and reads and analyzes the raw data 132 collected in the internal DB 224 to determine a feature quantity generation scheme and an abnormality detection scheme.

A feature quantity generation step (3) is then executed. In the feature quantity generation step (3), the feature quantity generation scheme determined in the data mining step (2) is applied to generate the feature quantity from the time-series raw data 132 of the internal DB 224.

The feature quantity generation step (3) is realized by the feature quantity generation program emulator 2266 of the support device 200 emulating the feature quantity generation program 174 using the time-series raw data 132 of the internal DB 224.

Then, a feature quantity learning step (4) is executed. In the feature quantity learning step (4), machine learning is performed on the feature quantity generated in the feature quantity generation step (3), and the abnormality detection parameter 136 and the learning data 134 are determined from a result of the machine learning. In the feature quantity learning step (4), the parameter determination unit 2263 of the support device 200 determines the abnormality detection parameter 136, and the learning data determination unit 2261 determines the learning data 134. In this embodiment, the abnormality detection parameter 136 includes a type or a determination index (typically, a threshold value or the like) of a feature quantity suitable for detection of an abnormality occurring in a control target. The feature quantity learning step (4) is realized by the determination unit 2264 using the machine learning engine of the support device 200.

An example of a feature quantity generation scheme in the feature quantity learning step will be described. FIG. 7 is a diagram schematically illustrating an example of a list showing feature quantities that can be determined in the data mining step of the control system 1 according to the embodiment. A plurality of feature quantities as illustrated in FIG. 7 are defined in advance, and a type of feature quantity that may be used for the raw data 132 collected in the internal DB 224 of the support device 200 is determined.

Specifically, the parameter determination unit 2263 calculates respective feature quantities illustrated in FIG. 7 using the raw data 132 collected in the internal DB 224, and determines the feature quantities having a higher correlation or relationship as candidates. Further, the learning data determination unit 2261 generates the learning data 134 which is a class consisting of a set of feature quantities of a type determined by the parameter determination unit 2263. Details of generation of the learning data 134 will be described later.

Alternatively, various types of principal component analysis may be adopted as a typical scheme. As a principal component analysis scheme, any known method can be adopted.

Through the steps (1) to (4) described above, the support device 200 can determine a definition of the feature quantity that is used for abnormality detection, and the abnormality detection parameter 136, the learning data 134, and the like for determining that there is an abnormality.

Further, a feature quantity monitoring step (5) and an evaluation step (6) are performed in the support device 200. In the feature quantity monitoring step (5), the time-series raw data 132, the score value 147, and the event log 146 are acquired from the control device 100 via the memory card 116 or the like, and stored in the internal DB 224 or the like. The acquisition of the data in the feature quantity monitoring step (5) is realized by the data access unit 2262, for example.

In an evaluation step (6), validity indicating whether or not the abnormality detection parameter 136 or the learning data 134 that is used for abnormality detection, that is, held in the control device 100, is suitable for detection of an abnormality occurring in the control target is evaluated. The evaluation step (6) is typically realized by the evaluation unit 2270 of the support device 200.

In an adjustment step (7), the adjustment unit 2271 performs adjustment (change) of the abnormality detection parameter 136 or the learning data 134 that is held in the control device 100. For example, the adjustment unit 2271 performs the adjustment based on the evaluation result of the evaluation unit 2270. The evaluation and the adjustment in the evaluation unit 2270 and the adjustment unit 2271 of the support device 200 will be described later.

<E. Feature Quantity Generation Step and Feature Quantity Learning Step>

A control program (user program) used in the feature quantity collection step (3) and the feature quantity learning step (4) in FIG. 6 will be described with reference to FIG. 8.

Figure 8:
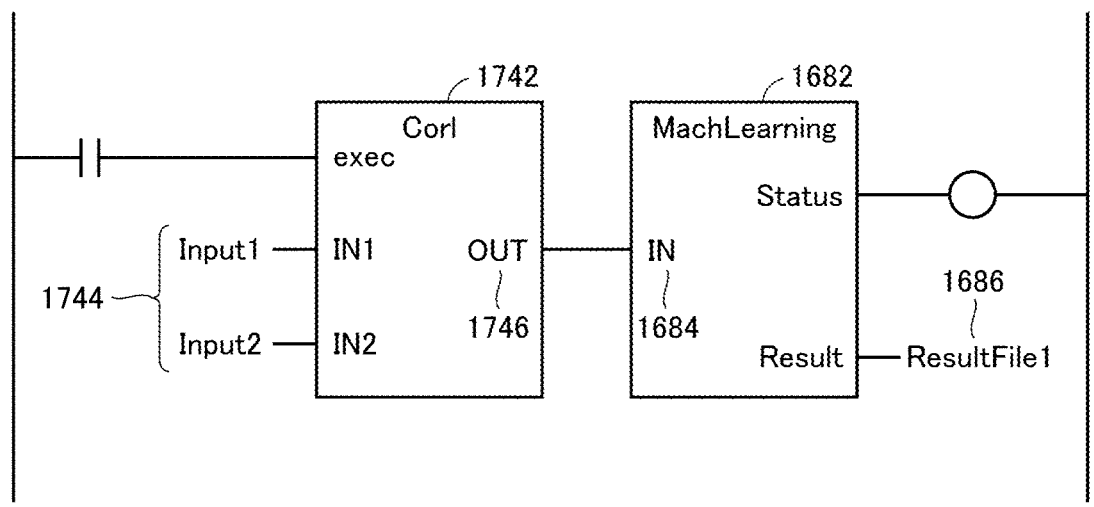
FIG. 8 is a diagram schematically illustrating an example of a feature quantity generation program and a program of a learning data determination unit according to this embodiment.

FIG. 8 is a diagram schematically illustrating an example of the feature quantity generation program and a program of the learning data determination unit according to the embodiment. In the feature quantity collection step (3) of FIG. 4 the feature quantity generation program 174 that is emulated by the feature quantity generation program emulator 2266 may be typically described using a feature quantity generation function block 1742. The feature quantity generation function block 1742 is a functional module that generates a feature quantity from the raw data 132.

For the feature quantity generation function block 1742, an input variable designation 1744 for specifying a variable that is used for calculation of the feature quantity and an output destination designation 1746 indicating an output destination of the calculated feature quantity are defined.

A functional block 1682 for executing a process corresponding to the learning data determination unit 2261 of the machine learning engine may be connected to an output stage (the output destination designation 1746) of the feature quantity generation function block 1742. That is, the output destination designation 1746 of the feature quantity generation function block 1742 is connected to input variable designation 1684 for designating a variable serving as the feature quantity of the learning target of the functional block 1682.

Information obtained as a result of the machine learning, that is, the learning data 134, is output in an output stage (learning result output destination designation 1686) of the functional block 1682.

FIG. 9 is a diagram schematically illustrating an example of the learning data 134 according to the embodiment. FIG. 9 is a diagram illustrating an example of a feature quantity space that is represented by a feature quantity obtained by plotting, in a corresponding coordinate space, samples of a feature quantity (usually, a feature quantity vector including a plurality of feature quantities) that is generated from the raw data 132. This feature quantity space corresponds to the learning data 134.

Usually, a label (normality or abnormality) is assigned to each feature quantity, and the user determines a range indicated by a dashed line defined by a threshold value 304 defining a class consisting of a set of feature quantities when the control target is in a normal state and/or a class consisting of a set of feature quantities when the control target is in an abnormal state while referring to the label assigned to each feature quantity. For example, the user may designate a reference position (a mark x in FIG. 9) which is an average position of N samples in a normal state and designate a range indicated by a dashed line with reference to the reference position, thereby designating the threshold value 304. A set of samples present in a range of the threshold value 304 indicated by the dashed line corresponds to a class consisting of a sample set in a normal state or an abnormal state (that is, learning data 134 in the normal state or learning data 134 in the abnormal state).

In the example illustrated in FIG. 9, the position, range, or the like of the dashed line for defining the threshold value 304 can be designated by the user operation. The designated threshold value 304 is included as an abnormality detection parameter 136.

FIG. 9 can also be provided as an example of a user interface screen for setting the range of the dashed line of the threshold value 304 on the feature quantity space. As illustrated in FIG. 9(A), samples collected in advance are plotted in the feature quantity space, and the user sets the range of the dashed line by operating a mouse or the like of the input unit 216 while referring to a distribution of the samples. Further, as illustrated in FIG. 9(B), it is also possible to adjust a size of the range of the dashed line by operating the mouse or the like. Thus, the user can variably set the threshold value 304 to be included as the abnormality detection parameter 136.

When the abnormality detection parameter 136 can be set, the feature quantity collection step (3) and the feature quantity learning step (4) in the support device 200 in FIG. 6 are completed. Thus, a function of determining the abnormality detection parameter 136 and the learning data 134 based on the learning result of machine learning is provided by executing the data mining tool 226 in the support device 200.

<F. Monitoring Process>

The monitoring process in the control device 100 according to the embodiment will be described.

Figure 10:
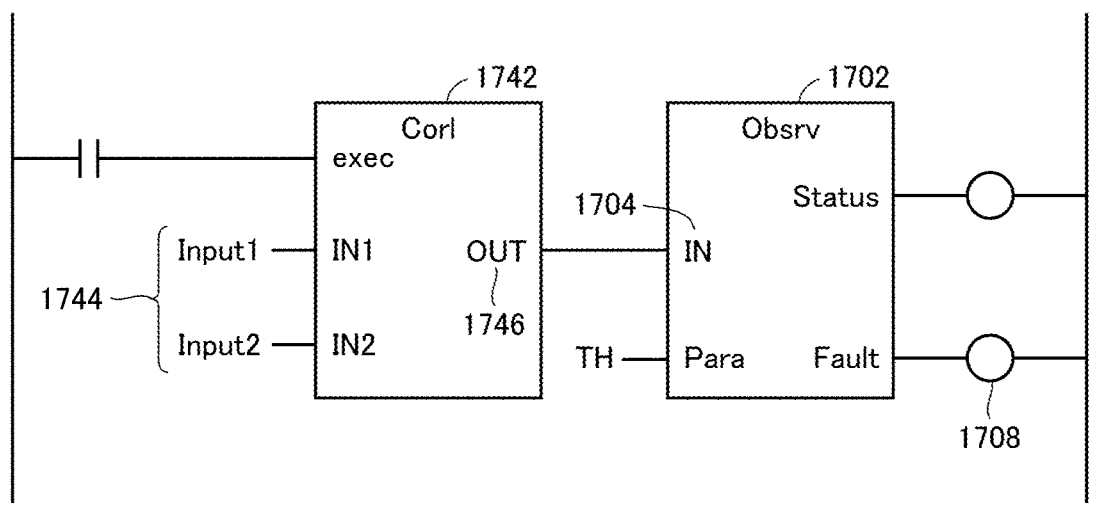
FIG. 10 is a diagram schematically illustrating an example of a monitoring processing program that is executed by a control device 100 according to the embodiment.

FIG. 10 is a diagram schematically illustrating an example of the monitoring processing program that is executed by the control device 100 according to the embodiment. The feature quantity generation program 174 that is executed in the feature quantity generation step (3) included in the monitoring process in the control device 100 is described using the feature quantity generation function block 1742, as in FIG. 8 described above.

A functional block 1702 is connected to the output stage (the output destination designation 1746) of the feature quantity generation function block 1742 in FIG. 10. The output destination designation 1746 of the feature quantity generation function block 1742 is connected to the input variable designation 1704 for designating a variable serving as a feature quantity of a monitoring target of the functional block 1702. Further, a variable value TH (hereinafter, also referred to as a threshold value TH) corresponding to the abnormality detection threshold value 304 included in the abnormality detection parameter 136 is defined in the functional block 1702. The functional block 1702 corresponds to a functional module of the abnormality detection engine 140.

The functional block 1702 compares, in each control cycle, the variable (the feature quantity) designated in the input variable designation 1704 with the threshold value TH corresponding to the threshold value 304 designated in the abnormality detection parameter 136, and sets a variable (the score value 147) defined as the abnormality detection output destination designation 1708 when an event in which the feature quantity crosses the threshold value TH occurs. In the user program, it is possible to immediately detect an abnormality in a facility or machine that is a control target based on the value of the variable (the score value 147) designated as the abnormality detection output destination designation 1708.

Here, the score value 147 can include, for example, a degree of separation of the feature quantity from the class of the learning data 134, such as a distance of the feature quantity from the reference position (see the mark x in FIG. 9) of the class of the learning data 134 or a distance between the feature quantity and the threshold value TH. Such a score value 147 may indicate a degree of classification into a class consisting of the learning data 134 in a normal state and a class consisting of the learning data 134 in an abnormal state.

The monitoring processing program (that is, the feature quantity generation program 174 and the function block of the abnormality detection engine 140) of the control device 100 illustrated in FIG. 10 described above corresponds to a program that is emulated by the monitoring processing emulator 2272 of the support device 200. Therefore, the support device 200 executes the emulation in the monitoring processing emulator 2272 using the time-series raw data 132 received from the control device 100, and therefore, the control device 100 can reproduce the monitoring process performed using the raw data 132 collected in the raw data collection step (1) (see FIG. 5).

<G. Evaluation Step and Adjustment Step>

Figure 11:
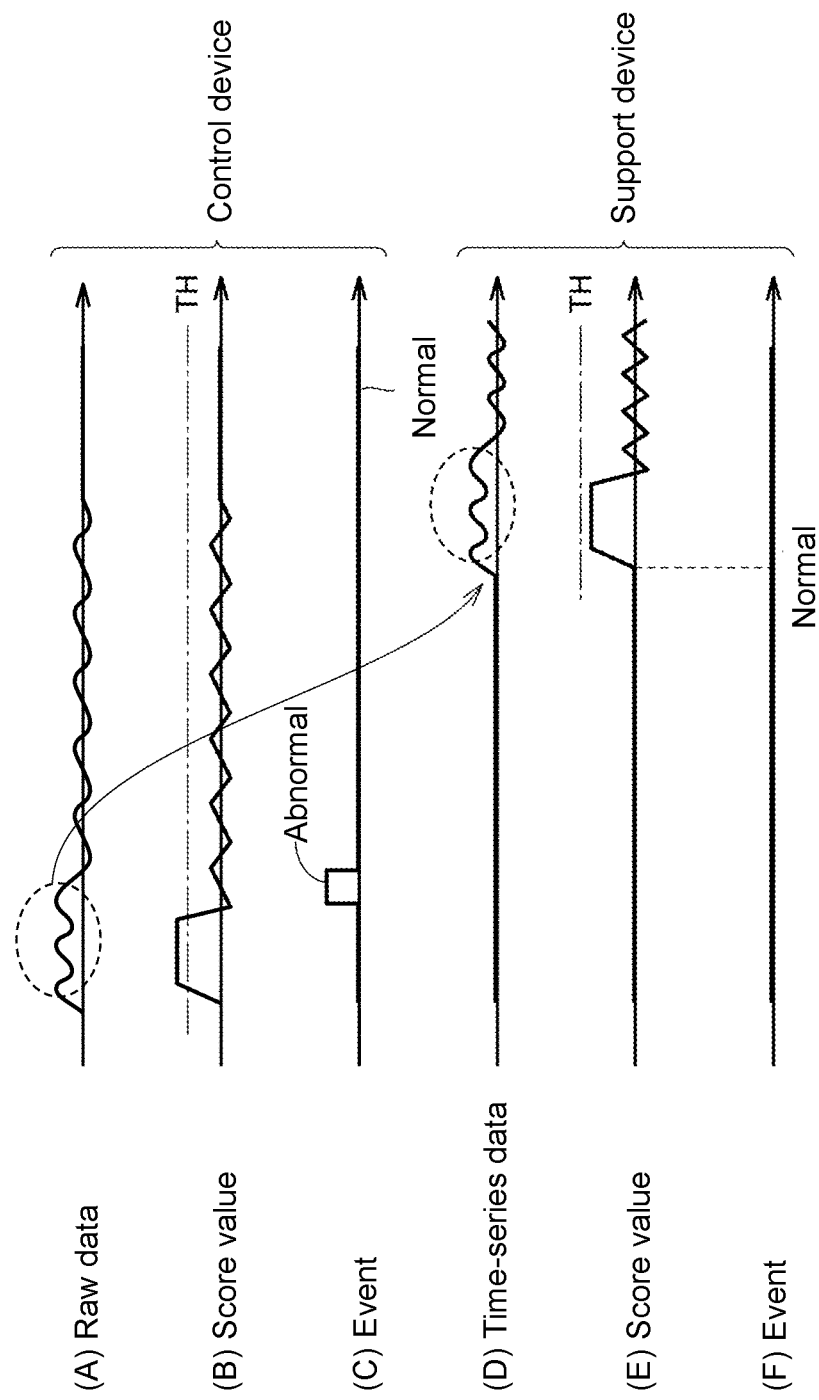
FIG. 11 is a schematic diagram illustrating an evaluation step and an adjustment step according to this embodiment.

FIG. 11 is a schematic diagram illustrating the evaluation step and adjustment step according to the embodiment. In this embodiment, in the evaluation step (6) of FIG. 6, the evaluation unit 2270 evaluates validity (suitability) indicating whether or not the abnormality detection parameter 136 or the learning data 134 held in the control device 100 is suitable for detection of an abnormality occurring in the control target.

The evaluation process will be described with reference to FIG. 11. In the control device 100, a monitoring process is performed using the feature quantity that is generated from the raw data 132 of FIG. 11(A), the abnormality detection parameter 136, and the learning data 134. Since the score value 147 that is output in the monitoring process crosses a threshold value TH as illustrated in FIG. 11(B), an event log 146 of "abnormality" is obtained as illustrated in FIG. 11(C).

When the event log 146 is generated, the evaluation unit 2270 evaluates the validity indicating whether the abnormality detection parameter 136 held in the control device 100 is suitable for detection of an abnormality occurring in the control target. For example, a case in which the event log 146 indicates an abnormality, but an operator determines that the control target is normal (there is no abnormality) when observing the control target will be described.

Specifically, the evaluation unit 2270 extracts the raw data 132 (a portion indicated by a dashed line in FIG. 11(D)) of a time corresponding to a time when "abnormality" has been recorded in the event log 146 from the time-series raw data 132 (a portion indicated by a dashed line in FIG. 11(D)) acquired from the control device 100. The evaluation unit 2270 causes the monitoring processing emulator 2272 to execute emulation of the monitoring process using the extracted raw data 132, the abnormality detection parameter 136 of the internal DB 224, and the learning data 134. A result of this emulation indicates that there is an abnormality as illustrated in FIGS. 11(B) and (D). The evaluation unit 2270 outputs an evaluation that the abnormality detection parameter 136 is not valid from the result of emulating this monitoring process.

The adjustment unit 2271, for example, changes the threshold value 304 illustrated in FIG. 9 according to a user operation. Accordingly, the threshold value 304 included as the abnormality detection parameter 136 of the internal DB 224 is changed.

The evaluation unit 2270 causes the monitoring processing emulator 2272 to execute the emulation of the monitoring process again using the abnormality detection parameter 136 having the extracted raw data 132 (a portion indicated by a dashed line in FIG. 11(D)) and the threshold value 304 after changing of the internal DB 224 and the learning data 134. When a result of this emulation indicates that there is no abnormality as illustrated in FIGS. 11(E) and 11(F), the evaluation unit 2270 outputs an evaluation that the abnormality detection parameter 136 after the adjustment (change) is valid from a result of emulating the monitoring process of the monitoring processing emulator 2272. It should be noted that in a case in which the evaluation unit 2270 evaluates that the abnormality detection parameter 136 after the adjustment (change) is not valid from a result of emulating the monitoring process when the emulation of the monitoring process has been executed again in the monitoring processing emulator 2272, the processes of the adjustment unit 2271 and the evaluation unit 2270 are repeated.

An adjustment method of the adjustment unit 2271 is not limited to changing of the threshold value 304. For example, when the type or the number of feature quantities to be defined is adjusted, the learning data 134 (the feature quantity space of FIG. 9) may be generated again, and the evaluation process of the evaluation unit 2270 including the emulation of the monitoring process of the monitoring processing emulator 2272 may be executed again.

The user transfers the abnormality detection parameter 136 or the learning data 134 after adjustment has ended, to the control device 100 via the memory card 116. Accordingly, the control device 100 can update the original abnormality detection parameter 136 or learning data 134 held in the internal DB 130 using the abnormality detection parameter 136 or the learning data 134 after the adjustment (that is, having validity).

(g1: Evaluation and Adjustment According to Additional Learning of Learning Data)

In the embodiment, the control device 100 can also perform additional learning on the learning data 134. Specifically, the control device 100 holds a class of the feature quantity (learning data 134) suitable for detection of an abnormality occurring in the control target, and the control device 100 updates the feature quantity included in the class using the feature quantity that is generated by the feature quantity generation program 174 during execution of the monitoring process. For example, using a feature quantity extracted from the generated feature quantity, the feature quantity is added to the learning data 134.

Thus, the feature quantity of the raw data 132 collected at the time of an operation of the production line in the control device 100 is added, and therefore, the learning data 134 changes. The evaluation unit 2270 may perform the evaluation process using the learning data 134 after the change. Based on a result of the evaluation process, the adjustment unit 2271 adjusts the abnormality detection parameter 136 or the learning data 134. Accordingly, the learning data 134 can be generated by the control device 100, and validity thereof can be evaluated by the evaluation unit 2270 of the support device 200.

(g2: Evaluation in Control Cycle)

Figure 12:
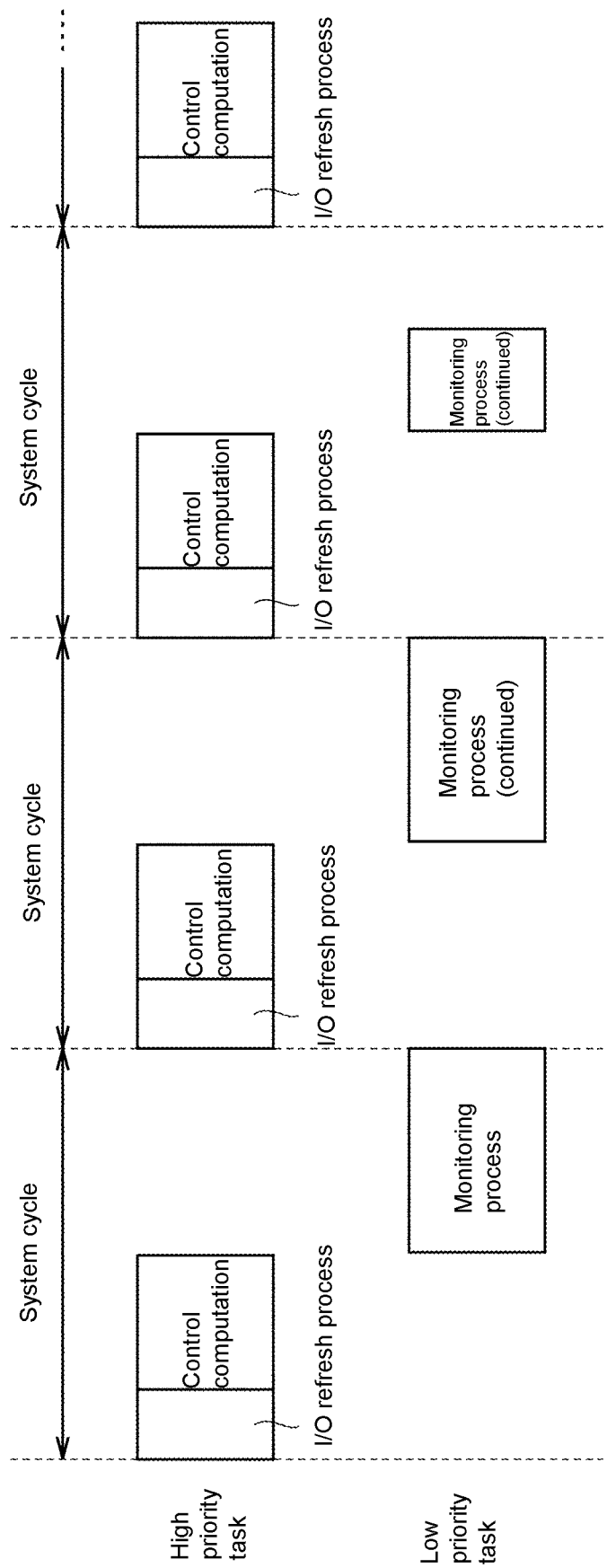
FIG. 12 is a schematic diagram illustrating execution of a process according to a priority in the control device 100 according to the embodiment.

FIG. 12 is a schematic diagram illustrating execution of a process according to a priority in the control device 100 according to the embodiment. Referring to FIG. 12, it is assumed that control computation is executed in each system cycle in the control device 100. The control computation includes control computation that is performed by executing the sequence/motion program 162. Specifically, the control computation includes, for example, sequence computation for executing a process according to various conditions, and motion computation for driving a servo driver or a servo motor. Such control computation is typically provided by the processor 102 of the control device 100 reading the user program stored in the secondary storage device 108, opening the user program in the main storage device 106, and executing the user program. That is, the processor 102 of the control device 100 and the user program provide a control computation process for cyclically executing control computation for controlling the control target.

As an example, it is assumed that two tasks (a high priority task and a low priority task) are set with different priorities. A process which is necessarily executed in each system cycle (for example, the I/O refresh process and the control computation) is registered as the high priority task, and a process that may be executed over a plurality of system cycles or a process for which an execution timing need not be strictly guaranteed (for example, the monitoring process) is registered as the low priority task.

As illustrated in FIG. 12, in each system cycle, when execution of the I/O refresh process and the control computation registered as the high priority tasks is completed, the monitoring process registered as the low priority task is executed. The low priority task is executed in a period in which the high priority task is not being executed in each system cycle. Therefore, a process registered as the low priority task cannot be completed in one system cycle in some cases. In the example illustrated in FIG. 12, it can be seen that the monitoring process is executed over three system cycles. It should be noted that, for example, when the control device 100 includes a plurality of processors 102 or when the processor 102 of the control device 100 includes a plurality of cores, each task may be executed in a distributed manner.

Thus, an execution management unit that executes the collection (the I/O refreshing process) of the raw data 132 of the variable manager 154 (the collection unit) and the control computation (the sequence/motion program 162) of the computation processing unit with a higher priority than the monitoring process (the feature quantity generation program 174 and the abnormality detection engine 140) of the monitoring processing unit is realized by the scheduler 152.

In the embodiment, in the support device 200, execution management according to the priority of the scheduler 152 is emulated by the scheduler emulator 2269 in the PLC emulator 2260. In the emulation of the scheduler emulator 2269, emulation is executed by a system program emulator 2267 that emulates collection (an I/O refresh process) of the raw data 132 that is performed by the variable manager 154 (a collection unit) and control computation (a sequence/motion program 162) of the computation processing unit, and the monitoring processing emulator 2272 that emulates the monitoring process.

The evaluation unit 2270 evaluates the validity from a scheduling result according to the emulation of the scheduler emulator 2269.

For example, it is possible to detect cycles necessary for completion of the monitoring process from a result of the emulation, and evaluate, for example, that the abnormality detection parameter 136 is not valid when the number of detected cycles exceeds a predetermined number of cycles. Specifically, it can be assumed that the type or the number of feature quantities designated by the abnormality detection parameter 136 is too large and the cycles necessary for completion of the monitoring process exceed a predetermined number of cycles. In this case, the evaluation unit 2270 outputs an evaluation that the abnormality detection parameter 136 is not valid.

<H. Functions Provided by Control System 1>

A function provided by each device of the control system 1 according to the embodiment will be described with reference again to FIG. 4. In FIG. 4, numbers in parentheses in a configuration of the control device 100 correspond to the processes in steps (1) to (6) illustrated in FIG. 5. Further, in FIG. 4, numbers in parentheses in a configuration of the support device 200 correspond to the processes in steps (1) to (7) illustrated in FIG. 6.

Referring to FIG. 4, the control device 100 includes the PLC engine 150, in addition to the internal DB 130 and the abnormality detection engine 140. These functions are basically realized by the processor 102 (FIG. 2) of the control device 100 executing a program. In order to provide an environment in which the processor 102 executes the program, an OS 190 is also installed in the control device 100.

The PLC engine 150 is typically provided by executing a system program and a user program on the OS 190. More specifically, the PLC engine 150 includes the scheduler 152, the variable manager 154, and the control program 160.

The scheduler 152 controls an execution timing, an execution order, and the like of each program (or a task corresponding to the program) constituting the PLC engine 150. In the embodiment, in the scheduler 152, an execution cycle is determined in advance for each task included in the PLC engine 150 corresponding to the execution management unit that executes the process according to the priority described above. The scheduler 152 performs control so that the program can be repeatedly executed according to the determined execution cycle and the priority.

The variable manager 154 manages, as a variable, data that is updated through the I/O refresh process that is cyclically executed in the PLC engine 150. More specifically, the variable manager 154 holds and manages a system variable 1542 including a data group indicating an operation state of each unit of the control device 100, and a user variable and device variable 1544 including a data group that is written or read by the user program that is executed by the PLC engine 150. In the embodiment, data associated with the control target mainly includes data that can be collected as the user variable and device variable 1544.

The control program 160 corresponds to a user program that the user can arbitrarily create, and typically includes a sequence/motion program 162, an internal DB access program 164, an abnormality detection engine interface 166, and a feature quantity generation program 174. Instructions of a program constituting the control program 160 may be described as an integrated program or may be described as a plurality of separate programs.

The sequence/motion program 162 includes an instruction for performing logical computation and/or numerical computation for controlling the control target. The internal DB access program 164 writes data of a variable designated in advance among variables included in the user variable and device variable 1544 to the internal DB 130. When the variable data is written to the internal DB 130, the time-series DB program 163 writes data to be written to the time-series DB 131 with a time stamp.

Further, the internal DB access program 164 writes, for example, the learning data 134 and the abnormality detection parameter 136 read from the storage medium such as the memory card 116 by the drive 204 to the internal DB 130. In addition, the internal DB access program 164 reads data such as the raw data 132, the learning data 134, and the score value 147 in the time-series DB 131 of the internal DB 130, and writes the read data to the storage medium such as the memory card 116 via the drive 204. The memory card 116 can be used as a storage medium for exchanging data between the control device 100 and the support device 200. It should be noted that the storage medium for data exchange is not limited to the memory card 116, and may be, for example, a USB memory.

The abnormality detection engine interface 166 includes an instruction for operating the abnormality detection engine 140. Specifically, the abnormality detection engine interface 166 includes an instruction to instruct the abnormality detection engine 140 to extract the feature quantity using the abnormality detection parameter 136, and an instruction to instruct the abnormality detection engine 140 to monitor the feature quantity using the abnormality detection parameter 136 and detect an abnormality.

The feature quantity generation program 174 includes an instruction to generate a feature quantity using a designated variable of the user variable and device variable 1544 according to a previously specified feature quantity generation scheme. An appropriate feature quantity generation scheme is determined according to the control target by the support device 200. That is, the feature quantity generation program 174 generates a feature quantity suitable for detection of an abnormality occurring in the control target from the data related to the control target.

Typically, the raw data 132 collected in the raw data collection step (1) of FIG. 5, the learning data 134 and the abnormality detection parameters 136 input from the support device 200, and the score value 147 output in the abnormality detection step (5) of FIG. 5 are stored in the internal DB 130. A part of the internal DB 130 constitutes the time-series DB 131 by the raw data 132 being time-stamped in an order of collection (detection) in the time-series DB storage step (2) of FIG. 5 and stored.

The abnormality detection engine 140 includes the feature quantity extraction unit 142 for executing a process necessary in the feature quantity extraction step (4) and the abnormality detection unit 144 for executing a process necessary in the abnormality detection step (5) in FIG. 5. The feature quantity extraction unit 142 extracts a feature quantity of a type indicated by the abnormality detection parameter 136 from the feature quantity that is generated through execution of the feature quantity generation program 174. The abnormality detection unit 144 detects an abnormality in the control target using the feature quantity extracted by the feature quantity extraction unit 142 and the abnormality detection parameter 136. When the abnormality detection unit 144 detects any abnormality, the abnormality detection unit 144 outputs the score value 147 and outputs the event log 146 indicating the detected content.

One support device 200 will be described. In the support device 200, the data mining tool 226 is installed. The data mining tool 226 is a tool for generating the abnormality detection parameter 136 and the learning data 134 suitable for detection of an abnormality occurring in the control target based on the raw data related to the control target collected by the control device 100 including the feature quantity generation program 174 and the abnormality detection engine 140. The generation of the abnormality detection parameter 136 and the learning data 134 can include a concept of a determination and adjustment (change) of the abnormality detection parameter 136 and the learning data 134.

The data mining tool 226 includes a data access unit 2262, a determination unit 2264, a PLC emulator 2260, and the evaluation unit 2270 and the adjustment unit 2271 described above. In the data mining tool 226, the PLC emulator 2260 is mainly provided as a program, and the other units are provided to include a program or a circuit (ASIC, FPGA, or the like).

The data access unit 2262 includes a module that is used for the support device 200 to exchange data with the control device 100. Specifically, the data access unit 2262 stores, in the internal DB 224, the time-series raw data 132, the score value 147, and the event log 146 read from the storage medium such as the memory card 116 via the drive 204, and the data access unit 2262 reads the abnormality detection parameter 136, the learning data 134, and the like determined (adjusted) by the support device 200 from the internal DB 224, and stores the abnormality detection parameter 136, the learning data 134, and the like in the memory card 116 via the drive 204. The raw data collection step (1) in FIG. 6 is realized by the data access unit 2262.

The determination unit 2264 corresponds to a machine learning engine, and includes a learning data determination unit 2261 that generates (determines) the learning data 134 by performing machine learning, and a parameter determination unit 2263 that determines the abnormality detection parameter 136.

The support device 200 includes an emulator that emulates a process (program) that is executed by the control device 100 on a processor (computer) of the support device 200. Specifically, the emulator included in the support device 200 is realized by the PLC emulator 2260 that emulates the PLC engine 150.

The PLC emulator 2260 includes a control program emulator 2265 that emulates a control program 160, a system program emulator 2267 that emulates a system program of the control device 100, and a scheduler emulator 2269 that emulates the scheduler 152.

The control program emulator 2265 includes a monitoring processing emulator 2272 that emulates the monitoring process, and the system program emulator 2267 includes a variable manager emulator 2268 that emulates the variable manager 154. The monitoring processing emulator 2272 includes an emulator that emulates the abnormality detection engine 140, and a feature quantity generation program emulator 2266 that emulates the feature quantity generation program 174.

The data mining step (2) in FIG. 6 is realized by the data mining tool 226. Further, the feature quantity collection step (3) is realized by the feature quantity generation program emulator 2266 emulating the feature quantity generation program 174 using the time-series raw data 132 in the internal DB 224.

Thus, the PLC emulator 2260 reproduces the process of monitoring the state of the control target in the "monitoring processing unit" of the control device 100.

Further, the support device 200 includes the evaluation unit 2270 that evaluates the validity of the abnormality detection parameter 136 or the learning data 134 held by the control device 100 as described above, and an adjustment unit 2271 for adjusting (changing) the abnormality detection parameter 136 or the learning data 134 held by the control device 100.

<K. Modification Example>

Although the learning data 134 is generated by the support device 200 and set in the control device 100 in the embodiment, the learning data 134 may be given data. In addition, the learning data 134 may be generated from the feature quantity when the control target is in an abnormal state or may be generated from the feature quantity when the control target is in the normal state.

Further, in the support device 200, the feature quantity from the time-series raw data 132 is generated by executing the feature quantity generation program emulator 2266, but a generation method is not limited to the method using the emulator. For example, the support device 200 may generate the feature quantity by executing a program having the same function as the feature quantity generation program 174 of the control device 100.

<J. Supplement>

The embodiment as described above includes the following technical spirit.

[Configuration 1]

A control system (1) including:
a control device (100) that controls a control target; and an information processing device (200) capable of exchanging data with the control device,
wherein the control device includes
a computation processing unit (162) that executes control computation of sequence control and motion control related to the control target;
a collection unit (154) that executes a process of collecting data associated with the control target; and
a monitoring processing unit (174, 140) that executes a process of monitoring a state of the control target,
the monitoring processing unit includes
a feature quantity generation unit (174) that executes a feature quantity generation process for generating a feature quantity from the data collected by the collection unit; and
a detection unit (140) that executes an abnormality detection process for detecting an abnormality occurring in the control target using the feature quantity generated by the feature quantity generation unit and an abnormality detection parameter (136) suitable for detection of an abnormality occurring in the control target that is set based on a result of machine learning, and
the information processing device includes a monitoring emulator (2272) that executes emulation of the monitoring process of the monitoring processing unit using the data associated with the control target from the control device.

[Configuration 2]

The control system according to configuration 1, wherein the control device further includes a database (131) that stores the data (132) associated with the control target collected by the collection unit in time series, and
the data associated with the control target that is used by the monitoring emulator of the information processing device includes data in the database of the control device.

[Configuration 3]

The control system according to configuration 1 or 2, wherein the information processing device further includes a unit (2270) that evaluates validity indicating whether the abnormality detection parameter held in the control device is suitable for detection of the abnormality occurring in the control target based on a result of the emulation of the monitoring process.

[Configuration 4]

The control system according to any one of configurations 1 to 3, wherein the control device further includes an execution management unit (152) that cyclically executes collection of data of the collection unit and control computation of the computation processing unit and executes a cyclic execution process for causing collection of data of the collection unit and control computation of the computation processing unit to be executed with a higher priority than the monitoring process of the monitoring processing unit in the cyclic execution,
wherein the information processing device includes a cyclic execution emulator (2269) that emulates the cyclic execution process of the execution management unit, and
emulation of a monitoring process of the monitoring emulator is executed in the emulation of the cyclic execution process of the cyclic execution emulator.

[Configuration 5]

The control system according to configuration 4, wherein the information processing device further includes a unit that evaluates validity indicating whether or not the abnormality detection parameter that is held in the control device is suitable for detection of an abnormality occurring in the control target, based on a result of the emulation of the cyclic execution process.

[Configuration 6]

The control system according to configuration 5, wherein the evaluation of the validity based on the result of the emulation of the cyclic execution process includes evaluation of the validity based on a result of a comparison between a time taken for emulation of the monitoring process in the emulation of the cyclic execution process and a length of the cycle.

[Configuration 7]

The control system according to any one of configurations 1 to 6, wherein the control device further includes a database (131) that stores the data associated with the control target collected by the collection unit in time series, and
the information processing device further includes
a time-series feature quantity generation unit that generates a feature quantity from time-series data of the data associated with the control target in the database of the control device, and
a determination unit (2264) that determines an abnormality detection parameter suitable for detection of an abnormality occurring in the control target by performing machine learning using the feature quantity generated by the time-series feature quantity generation unit.

[Configuration 8]

The control system according to configuration 7, wherein the monitoring emulator includes a feature quantity generation emulator (2266) that executes emulation of a feature quantity generation process of the feature quantity generation unit, and the time-series feature quantity generation unit includes a unit that causes the feature quantity generation emulator to execute emulation of the feature quantity generation process using the time-series data in the database to generate a feature quantity from the time-series data.

[Configuration 9]

The control system according to any one of configurations 1 to 8, wherein the abnormality detection parameter suitable for detection of the abnormality occurring in the control target includes a threshold value (TH, 304) for classifying the feature quantity generated by the feature quantity generation unit into a class of feature quantities suitable for detection of the abnormality occurring in the control target.

[Configuration 10]

The control system according to configuration 9, wherein the control device holds a class (134) of the feature quantity suitable for detection of the abnormality occurring in the control target, and the control device updates the feature quantity of the class using the feature quantity that is generated by the feature quantity generation unit during execution of the monitoring process.

[Configuration 11]

A control method that is executed by an information processing device (200) capable of exchanging data with a control device (100) that controls a control target, wherein the control device includes a computation processing unit (162) that executes control computation of sequence control and motion control related to the control target, a collection unit (154) that executes a process of collecting data associated with the control target, and a monitoring processing unit (174, 140) that executes a process of monitoring a state of the control target, the monitoring processing unit includes a feature quantity generation unit (174) that executes a feature quantity generation process for generating a feature quantity from the data collected by the collection unit; and a detection unit (140) that executes an abnormality detection process for detecting an abnormality occurring in the control target using the feature quantity generated by the feature quantity generation unit and an abnormality detection parameter (136) suitable for detection of an abnormality occurring in the control target that is set based on a result of machine learning, and the control method comprises receiving the data associated with the control target from the control device; and executing emulation of the monitoring process of the monitoring processing unit using the data associated with the control target received from the control device.

The embodiment disclosed herein should be considered illustrative in all respects and not restrictive. The scope of the present disclosure is indicated by the claims rather than the above description, and all modifications are intended to be included within the meaning and scope equivalent to the claims.

What is claimed is:

1. A control system, comprising:
a control device comprising a first processor that controls a control target and a database that stores the data associated with the control target in time series; and
an information processing device comprising a second processor and a connecting device that connects with and exchanges data with the control device,
wherein the first processor comprises:
executing control computation of a sequence control and a motion control related to the control target;
executing a process of collecting data associated with the control target; and
executing a process of monitoring a state of the control target, comprising:
executing a feature quantity generation process for generating a first feature quantity from the collected data; and
executing an abnormality detection process for detecting an abnormality occurring in the control target using the first feature quantity and an abnormality detection parameter suitable for detection of an abnormality occurring in the control target, wherein the abnormality detection parameter comprises a threshold value that is set for classifying the first feature quantity into a class of feature quantities suitable for detection of the abnormality occurring in the control target based on a result of machine learning,
wherein the first processor further comprises cyclically executing the process of collecting data and the control computation, and executing a cyclic execution process for causing the process of collecting data and the control computation to be executed with a higher priority than the monitoring process in the cyclic execution, and
the second processor comprises:
executing emulation of the monitoring process using the data associated with the control target from the control device,
emulating the cyclic execution process, wherein the emulation of the monitoring process is executed in the emulation of the cyclic execution process,
evaluating validity indicating whether or not the abnormality detection parameter that is held in the control device is suitable for detection of the abnormality occurring in the control target based on the result of the emulation of the cyclic execution process and a result of a comparison between a time taken for the emulation of the monitoring process in the emulation of the cyclic execution process and a length of a cycle of the cyclic execution process,
if evaluation of the validity indicates the abnormality detection parameter is not valid, generating a second feature quantity from time-series data of the data associated with the control target in the database of the control device, changing the abnormality detection parameter suitable for detection of the abnormality occurring in the control target by performing machine learning using the generated second feature quantity, and repeating the emulation of the monitoring process and the evaluating of the validity, and
if the evaluation of the validity indicates the abnormality detection parameter is valid, determining the abnormality detection parameter is suitable for detection of the abnormality.

2. The control system according to claim 1, wherein the second processor comprises executing emulation of the feature quantity generation process, and executing the emulation of the feature quantity generation process using the time-series data in the database to generate the second feature quantity from the time-series data.

3. The control system according to claim 1,
wherein the first processor holds the class of feature quantities suitable for detection of the abnormality occurring in the control target, and
the first processor updates the feature quantities of the class using the first feature quantity generated during execution of the monitoring process.

4. A control method that is executed by an information processing device comprising a second processor and a connecting device that connects with and exchanges data with a control device comprising a first processor that controls a control target and a database that stores the data associated with the control target in time series,
wherein the first processor comprises:
executing control computation of a sequence control and a motion control related to the control target,
executing a process of collecting data associated with the control target, and
executing a process of monitoring a state of the control target, comprising:
executing a feature quantity generation process for generating a first feature quantity from the collected data; and
executing an abnormality detection process for detecting an abnormality occurring in the control target using the first feature quantity and an abnormality detection parameter suitable for detection of an abnormality occurring in the control target, wherein the abnormality detection parameter comprises a threshold value that is set for classifying the first feature quantity into a class of feature quantities suitable for detection of the abnormality occurring in the control target based on a result of machine learning,
wherein the first processor further comprises cyclically executing the process of collecting data and the control computation, and executing a cyclic execution process for causing the process of collecting data and the control computation to be executed with a higher priority than the monitoring process in the cyclic execution, and the control method comprises:

receiving the data associated with the control target from the control device; and executing emulation of the monitoring process using the data associated with the control target received from the control device, emulating the cyclic execution process, wherein the emulation of the monitoring process is executed in the emulation of the cyclic execution process, evaluating validity indicating whether or not the abnormality detection parameter that is held in the control device is suitable for detection of the abnormality occurring in the control target based on the result of the emulation of the cyclic execution process and a result of a comparison between a time taken for the emulation of the monitoring process in the emulation of the cyclic execution process and a length of a cycle of the cyclic execution process, if evaluation of the validity indicates the abnormality detection parameter is not valid, generating a second feature quantity from time-series data of the data associated with the control target in the database of the control device, changing the abnormality detection parameter suitable for detection of the abnormality occurring in the control target by performing machine learning using the generated second feature quantity, and repeating the emulation of the monitoring process and the evaluating of the validity, and if the evaluation of the validity indicates the abnormality detection parameter is valid, determining the abnormality detection parameter is suitable for detection of the abnormality.

* * * * *